United States Patent
Gatto et al.

(10) Patent No.: US 7,346,917 B2
(45) Date of Patent: Mar. 18, 2008

(54) TRUSTED TRANSACTIONAL SET-TOP BOX

(75) Inventors: Jean-Marie Gatto, London (GB); Thierry Brunet De Courssou, Palo Alto, CA (US)

(73) Assignee: Cyberview Technology, Inc., Palo Alto, CA (US)

( * ) Notice: Subject to any disclaimer, the term of this patent is extended or adjusted under 35 U.S.C. 154(b) by 926 days.

(21) Appl. No.: 09/862,165

(22) Filed: May 21, 2001

(65) Prior Publication Data

US 2002/0174444 A1 Nov. 21, 2002

(51) Int. Cl.
*H04N 7/16* (2006.01)
*H04N 5/445* (2006.01)
*G06F 3/00* (2006.01)
*G06F 13/00* (2006.01)

(52) U.S. Cl. .................. 725/5; 725/2; 725/60
(58) Field of Classification Search ............ 725/1, 725/2, 6, 109, 112, 131, 4, 5, 60; 705/26, 705/27, 75
See application file for complete search history.

(56) References Cited

U.S. PATENT DOCUMENTS

| | | | | |
|---|---|---|---|---|
| 5,014,125 A | * | 5/1991 | Pocock et al. ............... | 725/93 |
| 5,691,525 A | * | 11/1997 | Aoki et al. ................. | 235/379 |
| 5,848,934 A | | 12/1998 | Shiels et al. | |
| 5,862,326 A | * | 1/1999 | Bapat ........................... | 709/203 |
| 5,878,141 A | | 3/1999 | Daly et al. | |

(Continued)

FOREIGN PATENT DOCUMENTS

EP 0 836 324 A2 4/1998

(Continued)

OTHER PUBLICATIONS

Silicon Image, Silicon Image All Digital—No Limits, Products, Features Overview, pp. 1-2, World Wide Web, http://siimage.com/products/overview_sii861.asp (Printed on May 3, 2001).

(Continued)

*Primary Examiner*—Chris Kelley
*Assistant Examiner*—Michael Van Handel
(74) *Attorney, Agent, or Firm*—Young Law Firm, P.C.

(57) ABSTRACT

A set top box (STB) includes a trusted transactional cache and associated transactional protocol and enables e-commerce transactions to be securely committed to a remote server extremely quickly and with little network overhead. The invention does away with the user concern of whether the transaction was successful. The STB operates equally well on robust private networks as on unpredictable Internet or wireless networks, and avoids upsetting users who would otherwise have to wait in front of a display screen for confirmation of completion of the transaction after a temporary communication failure with the central site. The method may advantageously be used to provide cost-effective micro-payments solutions. The STB may include a dual headed display capability in which data and video maybe be directed to separate displays. The STB may feature an embedded ticket printer, as well as an embedded barcode scanner. This enables non computer literate users to more conveniently track transactions committed via the STB, or to take advantage of promotional coupons. The STB features an embedded hardware true Random Number Generator to produce maximum entropy encryption keys, therefore providing maximum secure and fool-proof means to protect private data using government authorized encryption schemes.

18 Claims, 20 Drawing Sheets

U.S. PATENT DOCUMENTS

| | | | |
|---|---|---|---|
| 5,880,720 | A | 3/1999 | Iwafune et al. |
| 5,905,521 | A | 5/1999 | Gatto |
| 5,907,801 | A * | 5/1999 | Albert et al. ............... 455/406 |
| 5,915,019 | A | 6/1999 | Ginter et al. |
| 5,958,004 | A | 9/1999 | Helland et al. |
| 5,960,411 | A | 9/1999 | Hartman |
| 6,047,356 | A * | 4/2000 | Anderson et al. ........... 711/129 |
| 6,118,860 | A | 9/2000 | Hillson |
| 6,199,055 | B1 | 3/2001 | Kara et al. |
| 6,233,565 | B1 | 5/2001 | Lewis et al. |
| 6,282,522 | B1 | 8/2001 | Davies et al. |
| 6,330,719 | B1 * | 12/2001 | Zigmond et al. ........... 725/121 |
| 6,543,052 | B1 * | 4/2003 | Ogasawara ................. 725/60 |
| 2002/0013950 | A1 * | 1/2002 | Tomsen ....................... 725/109 |
| 2002/0112235 | A1 * | 8/2002 | Ballou et al. .................. 725/25 |
| 2002/0174160 | A1 * | 11/2002 | Gatto et al. ..................... 709/1 |
| 2004/0068541 | A1 * | 4/2004 | Bayassi et al. ............. 709/204 |
| 2004/0254954 | A1 * | 12/2004 | Gatto et al. .............. 707/104.1 |
| 2005/0086286 | A1 * | 4/2005 | Gatto et al. ................. 709/200 |

FOREIGN PATENT DOCUMENTS

| EP | 0 836 324 A3 | 4/1998 |
|---|---|---|

OTHER PUBLICATIONS

Silicon Image, *Silicon Image All Digital—No Limits, Products, Features Overview*, pp. 1-2, World Wide Web, http://siimage.com/products/overview_sii861.asp (Printed on May 3, 2001).

Schneier, Bruce, *Secrets and Lies: Digital Security In A Networked World*, Ch. 6, pp. 85-101, John Wiley & Sons, Inc., 2000.

Schneier, Bruce, *Secrets and Lies, Digital Security In A Networked World*, Ch. 7, pp. 102-119, John Wiley & Sons, Inc., 2000.

Schneier, Bruce, *Secrets and Lies, Digital Security In A Networked World*, Ch. 20, pp. 307-317, John Wiley & Sons, Inc., 2000.

Intel (R) Security Program: Intel (R) Random Number Generator (RNG), *Intel Random Number Generator: Hardware Support That Helps Improve A Range Of Security Technologies*, p. 1, wysiwyg://2/http://developer.intel.com/design/security/rng/rng.htm (Printed on Jan. 31, 2001).

Microsoft Passport: A Single Name, Password and Wallet For The Web! *Microsoft Passport: One Name. One Password*, pp. 1-2, http://www.passport.com/Consumer/Default.asp?Pplcid=1033 (Printed on Mar. 19, 2001).

Simtek Corporation, *Simtek: Memory Like A Steel Trap—World's Fastest Reprogrammable Nonvolatile Memories*, p. 1, http://www.simtek.com/ (Printed on Jan. 31, 2001).

Simtek, *nvSRAM Basics*, pp. 8-1 through 8-6.

* cited by examiner

TRUSTED TRANSACTIONAL SET-TOP BOX

CROSS-REFERENCE TO RELATED APPLICATIONS

This application is related to co-pending and commonly assigned application Ser. No. 09/861,850, filed May 21, 2001, and application Ser. No, 09/862,036, filed May 21, 2001, both applications of which are hereby incorporated herein in their entirety.

BACKGROUND OF THE INVENTION

1. Field of the Invention

The invention generally pertains to the field of interactive television (TV) Set-Top Boxes (STB), electronic commerce and the merging of technology and personal services.

2. Description of the Related Art

There are approximately 1.5 billion TV sets in homes around the world and 400 million PCs in households worldwide. A conventional set-top box is a device that enhances the viewer's TV experience by incorporating therein some of the functionality of computers, by enabling the TV to become a user interface to the Internet and by enabling the TV to receive and decode digital television broadcasts. Some STBs even provide integrated videoconferencing functionality as well as video editing and Internet-enabled home video security, such as described in U.S. patent Ser. No. 5,905,521. STBs such as described in U.S. Pat. No. 5,905,521 also feature "Personal Identification" remote control devices capable of automatically identifying the user holding the remote control and producing his credentials (personal and financial information, for example) when conducting secure transactions either locally or with a remote server.

Such heavily featured STBs are highly desirable for most TV viewers who do not want to be confronted with the usual headaches of setting up and upgrading the hardware and software of a typical personal computer, as well as for hotels and motels who need to attract the new generation of customers accustomed to Internet everywhere. Advances in silicon integration are breathtaking and it is foreseen that most of the features listed above will soon only require only a few integrated circuits (ICs).

However, time to market considerations and proof of concept cycles do not yet permit to derive the perfect architecture for the STB of the future. For example, until High Definition Television (HDTV) is widely available, the resolution of TV screens is not adequate for comfortably carrying out such activities as email and web browsing. To draw from another example, STBs are beginning to offer Internet broadband to the entire home network, thereby potentially making everybody's confidential information accessible to and available from the Internet. However, the privacy risks inherent in such capabilities have not yet been seriously considered.

Moreover, the STB e-commerce model is presently ill defined, as it is directly derived from the PC e-commerce model traditionally practiced using a PC connected to the Internet and a web browser. Although goods and services providers can offer attractive, practical, efficient and reliable e-commerce via the Internet, a typical end-to-end e-commerce transaction can take several minutes to complete. As there are no dedicated peripherals to speed up the entry of user credentials and the item chosen, all the details must be entered via a keyboard and mouse.

Moreover, existing e-commerce methods can leave the consumer wondering whether the online transaction was successfully completed. At times, the consumer may not be certain that the online transaction was successfully completed until the goods actually show up at the door. A good practice is for the e-commerce provider to send an acknowledgment of the consumer's order by email, the email containing all of the details needed to allow the user to check on the current status of the order. E-commerce sites such as Amazon.com have refined the process in order to provide an excellent quality of service that most have come appreciate and trust. For example, the "1-click" purchase model patented by Amazon.com considerably speeds up the purchase of items for already registered users, and the user need not wait online for a confirmation that the credit card payment was accepted. Moreover, easy account access allows the user to check the status of a pending order and the status of the delivery. Every change made either by the user or by the provider is automatically acknowledged in an email message posted to the user.

Removing the issue of bad or non-payment, such a transactional model for executing an online transaction is essentially biased in favor of the provider, in that the provider always knows whether the purchase request is valid or is invalid. In contrast, the online shopper may have doubts as to the success of his or her purchase request until such time as an explicit acknowledgment is provided, which may not occur until a quite a significant time after the online order has been submitted. Typically, the acknowledgment is supplied as a displayed message or an email. This is because e-commerce servers are not optimized to provide an instantaneous acknowledgment of a purchase request, especially when a clearing bank is involved in validating a credit card purchase. This is particularly annoying for viewers waiting to resume their STB/TV entertainment experience.

Consequently, because of the lack of a reliable, speedy and trusted e-commerce transactional model for transactions of all sizes (including very small valued transactions), consumer-oriented Internet appliances such as STBs that are optimized to carry out e-micro-commerce are quasi-inexistent.

SUMMARY OF THE INVENTION

An object of the present invention, therefore, is to offer a method for conducting trusted e-commerce transactions via STBs, whereby the e-commerce transaction is performed in seconds or even sub-seconds and whereby the user need not be concerned by the possible failure of the transaction commit to the remote server.

It is a further object of the invention to help home users keep track of the status of e-commerce transactions by printing tickets with explicit text and/or machine-readable indicia such as barcode. It is another object of the present invention to allow the user to near instantaneously retrieve the transaction status by scanning the ticket barcode. It is a further object of the present invention to solve the problems inherent in the poor resolution of the TV display for comfortable Internet email and web browsing. It is yet another object of the present invention to provide an STB with strong encryption capabilities. Such an STB would enable the generation of encryption keys with maximum entropy and would, therefore, provide maximum encryption security for trusted and secure e-commerce transactions.

According to an embodiment of the present invention, a set top box may include a processor for controlling the set top box; a video decoder controlled by the processor, the video decoder providing a decoded video signal; a graphics interface coupled to the video decoder to output the decoded video signal to at least one display; a network interface to access a computer network; a user interface enabling user interaction with the processor and initiation of a transaction with a remote server coupled to the computer network, and a non-volatile cache memory controlled by the processor and configured to selectively store a context of the transaction to enable a recovery of the transaction after an interruption thereof.

The non-volatile cache memory may include a Non-Volatile Random Access Memory (NVRAM), a context data save engine for selectively storing the context of the transaction to the NVRAM and a context data recovery engine for retrieving the stored context from the NVRAM and recovering the transaction to enable a successful completion of the transaction. The context data save engine may be configured to store the context of the transaction before sending the transaction to the remote server, after sending the transaction to the remote server but before having received an acknowledgment of the transaction from the remote server and/or after having received a confirmed acknowledgment of the transaction from the remote server, for example. The set top box may further include a printer controlled by the processor, the printer being configured to print human-readable information and/or machine-readable information. The printer may be configured to print an acknowledgment (such as a ticket or receipt, for example) of the transaction. The set top box may also include a reader controlled by the processor, the reader being configured to scan and decode printed machine-readable code. The machine-readable information may include a barcode and the reader may include a barcode reader. The processor may be configured to execute the transaction in a first user session that concludes after the context data save engine has saved the context of the transaction to the NVRAM and a provisional acknowledgment has been provided to the user and to execute a second remote server session that concludes after a confirmed acknowledgement has been received from the remote server and provided to the user. The set top box may further include a hardware random number generator, the hardware random number generator being configured to provide the processor with encryption keys to encrypt the user initiated transaction. The display(s) that may be coupled to the present STB may include (one or more of) a television set, a High Definition Television (HDTV) and/or a computer monitor, and the graphics interface may be configured to selectively output the decoded video signal to the display(s) in full screen mode, picture-in-picture mode, mosaic mode or multi-window mode, for example. The set top box may also include a magnetic and/or smart card reader.

The present invention is also a set top box, comprising a processor for controlling the set top box; a video decoder controlled by the processor, the video decoder providing a decoded video signal; a graphics interface coupled to the video decoder to output the decoded video signal to at least one display; a network interface to access a computer network; a user interface enabling user interaction with the processor and initiation of a transaction with a remote server coupled to the computer network, and a printer controlled by the processor, the printer being configured to print human readable information and/or machine readable information.

The present invention, according to another embodiment thereof, is a set top box, comprising a processor for controlling the set top box; a video decoder controlled by the processor, the video decoder providing a decoded video signal; a graphics interface coupled to the video decoder to output the decoded video signal to at least one display; a network interface to access a computer network; a user interface enabling user interaction with the processor and initiation of a transaction with a remote server coupled to the computer network, and a reader controlled by the processor, the reader being configured to scan and decode printed machine-readable code.

The present invention may also be viewed as a method of carrying out an online transaction between a set top box and a remote server, each of the set top box and the remote server being coupled to a network, the method comprising the steps of initiating a transaction at the set top box; storing a copy of the transaction in a non-volatile memory within the set top box; sending the transaction to the remote server under a control of the set top box, and carrying out one of: receiving a confirmed acknowledgment of the transaction from the remote server and providing the confirmed acknowledgment, and generating a provisional acknowledgment of the transaction from the copy of the transaction stored in the non-volatile memory if the confirmed acknowledgment is not received within a predetermined period of time.

The method may further include the step of receiving the confirmed acknowledgment from the remote server after the predetermined period of time and storing the received confirmed acknowledgment in the non-volatile memory. A step of providing the stored confirmed acknowledgment upon request may also be carried out. The method may also include a step of re-sending the copy of the user transaction stored in the non-volatile memory to the remote server upon failure to receive the confirmed acknowledgment from the remote server. The re-sending step may be carried out (preferably under the control of the STB) until a confirmed acknowledgment of the transaction is received from the remote server, or may be carried out predetermined number of times, for example. The generating step may include a step of printing the provisional acknowledgment together with corresponding machine-readable information that uniquely identifies the transaction. The generating step may include a step of printing the provisional acknowledgment together with machine-readable information uniquely identifying the transaction and the method further may include a step of the set top box reading the machine-readable information and providing the stored confirmed acknowledgment that corresponds to the read machine-readable information. The stored confirmation acknowledgment providing step may include a step of printing the confirmation acknowledgment. The set top box may include a user interface that enables user interaction with the set top box and the initiating step may include a step of providing user credentials and selecting goods and/or services for purchase via the user interface. The user credentials may include identification and payment instrument information (for example) and the user credentials may be supplied to the set top box via a remote control device. The initiating step may include a step of encapsulating all information required for the remote server to process the transaction into a single data packet and the storing and sending steps may store and send the single data packet in the non-volatile memory and to the remote server, respectively. The information required for the remote server to process the transaction may include user credentials including at least one of an identity of the user; payment instrument information; delivery information, and/or information identifying the subject matter of the transaction, for example. A step of encrypting the single data packet prior to the sending step may also be carried out.

DESCRIPTION OF THE INVENTION

Figure 1:
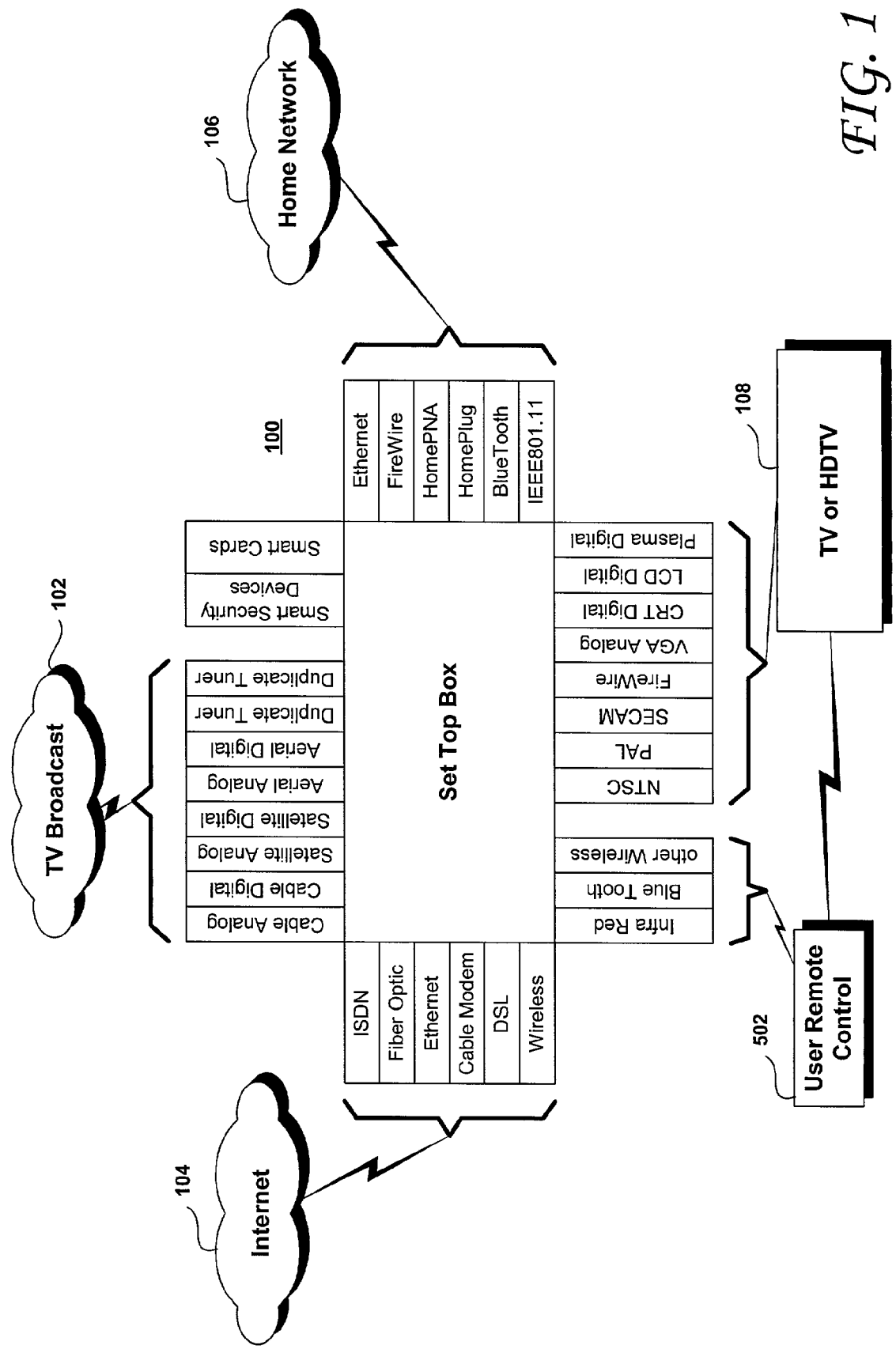
FIG. 1 is a diagram of a connected universe accessible to a STB according to the present invention.

Although TVs are currently essentially used for entertainment, interactive TV set top boxes can advantageously leverage on the Internet advances by rapidly integrating all the functions found on advanced entertainment PCs such as:

Analog and Digital Cable/Satellite/Aerial Tuners (including stackable and replaceable plug-in receivers);

Broadband Internet (Cable, Ethernet, DSL, Fiber Optic, etc.);

Direct Video input/output (composite, S-Bus, FireWire IEEE1394, USB2, etc.);

Multi-Tuners and multi-MPEG2 Decoders (allowing picture-in-picture viewing or mosaic pictures viewing);

Multi-MPEG2 Encoders (allowing multi-channel recording or as well as direct multi-source video recording);

Software Video Decoders allowing Internet Video Streaming (such as RealVideo and Microsoft Media Video Player);

High-Definition TV (HDTV);

Personal Video Recorder (PVR), allowing recording of video on hard disk;

DVD Player (allowing viewing of DVD, VCD and MPEG1 movies available on CD format);

DVD-RAM (allowing off-loading of video recorded on hard disk);

Electronic Program Guide (EPG);

Pay Per View;

Video on Demand (VOD);

Internet Email & Browsing;

Interactive TV (WebTV, OpenTV, Liberate, etc. . . . );

3D Gaming, including multi-user online gaming;

Audio Jukebox (MP3, MS Media Player, RealAudio, etc.);

Karaoke;

Internet Gateway/Firewall/VPN for the home (home network to client PCs, client STBs and Internet Appliances via wired/wireless network such as Ethernet, HomePNA, HomePlug, BlueTooth, etc.);

Telephony Voice-over-IP (VoIP);

Photo Albums/Video Albums;

Smart Card interfaces for enabling Encryption/Decryption of content, as well as for conducting secured E-Commerce;

Biometric identification;

Activation of main STB un-used resources by client STBs, client PCs or Internet Appliances on the home network (un-used resources such as channel tuners, DVD player, PVR, etc.);

Snap-In External Video Storage (such as high-capacity hard disks connected via Plug-And-Play interfaces such as FireWire, USB2 or Ethernet);

The concepts underlying the STB of the present invention are best understood when expressed in terms of an "STB connected universe", which shows the manner in which the present STB acts a gateway to the surrounding world. FIG. 1 is a diagram of such a connected universe accessible to a STB 100 according to the present invention. A STB 100, according to the present invention, connects to the TV broadcast network 102, the Internet 104, the home network 106, the TV or HDTV set 108 and/or the user remote control 502, for example. The interface of the present STB 100 to the TV broadcast network 102 may be via a cable analog tuner, a cable digital tuner, a satellite analog tuner, a satellite digital tuner, an aerial analog tuner and/or an aerial digital tuner, for example. All or some of the above-listed tuners may advantageously be provided as stacked replaceable modules. Moreover, multiple identical tuners may be provided to allow the user to simultaneously view several channels from the same tuner type or channel provider.

The interface of the STB 100 to the Internet 104 may be via a modem (a 56K modem, for example), Integrated Services Digital Network (ISDN), cable modem (return channel), Digital Subscriber Line (DSL), residential Ethernet and/or residential Wireless, to name only a few illustrative examples. One or several of the above listed interfaces may also be provided as stacked replaceable modules. The interface of the STB 100 to the home network 106 may be via Local Area Ethernet (10/100/1000 Mbits/sec., for example), FireWire, Universal Serial Bus 2 (USB2), Home-PNA, HomePlug, BlueTooth, IEEE801.11, to name a few exemplary interfaces. Again, one or more of the above-listed interfaces may be provided as stacked replaceable modules.

The interface of the STB 100 to the TV or HDTV 108 may be via NTSC/Pal or Secam, VGA (standard PC monitor interface), FireWire, Digital CRT Monitor, Digital LCD Monitor and/or a Digital Plasma Monitor, for example. It is to be noted that as analog video sources are rapidly disappearing, digital interfaces will become the standard interface for all TV and data displays.

To assist in carrying out secure e-commerce transaction, the STB 100 may also be equipped with security device interfaces, such as smart cards and/or smart card readers (for decrypting), smart security devices such as Smart Compact Flash, Smart Media Flash, Smart Dongles, etc. The STB 100 may also include (and/or include suitable interfaces to) biometric devices such as fingerprint readers and the like. The STB 100 may communicate with the User Remote Control 502 via a number of interfaces such as a traditional TV/VCR-type hand held device, a keyboard/mouse or other pointing device or a Personal Remote Control (shared or individual), for example. The interface may implement any of a number of technologies, such as Infra-Red (IR) or BlueTooth, for example.

Figure 2:
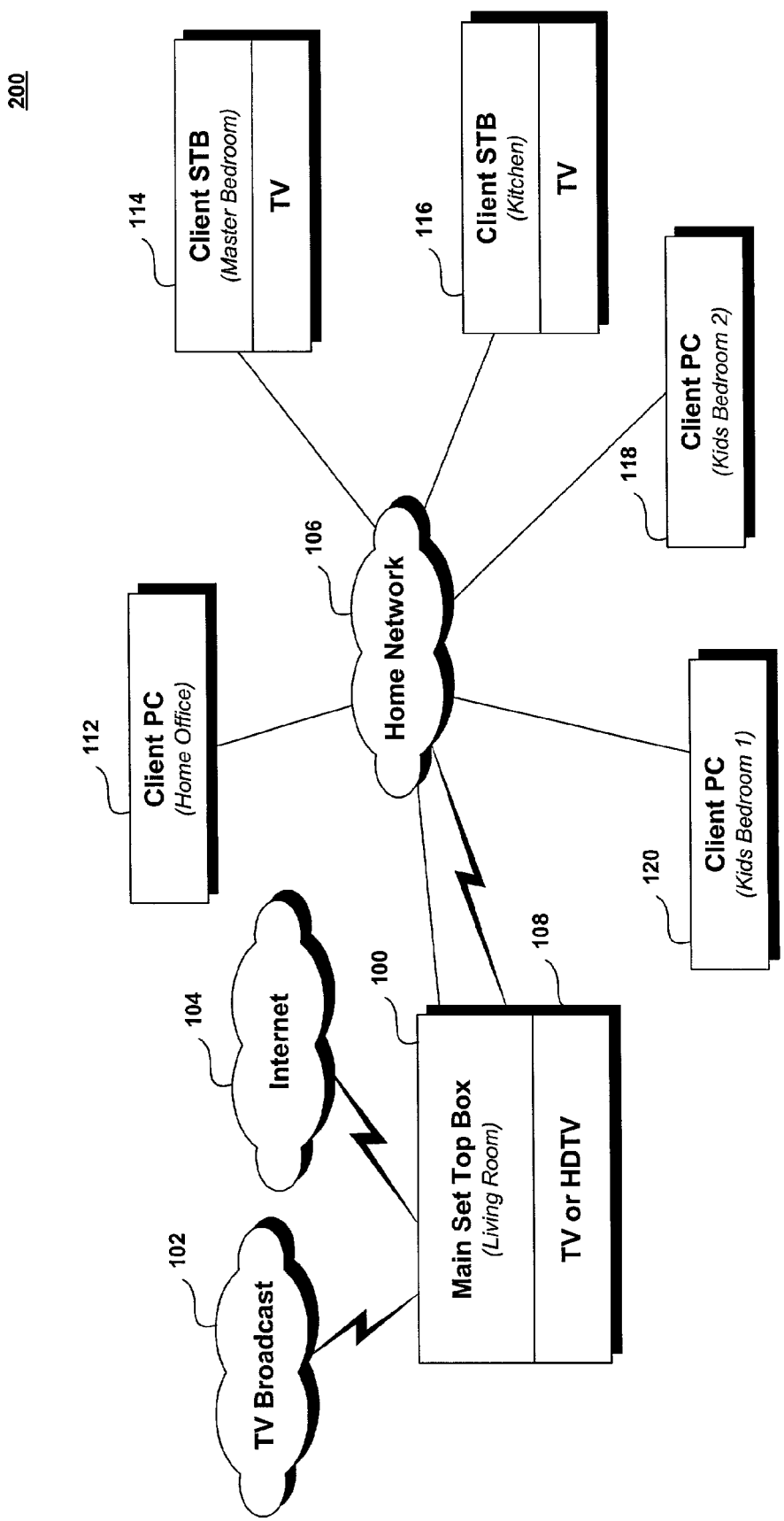
FIG. 2 is a block diagram of a home network in which STBs according to the present invention may be employed.

FIG. 2 is a system-level block diagram of a home network 106 in which STBs according to the present invention may be employed. The present STB 100 is also capable of sharing its unused resources with client devices in the house such as PCs and "Client STBs". The client devices may be connected to the main STB 100 via the home network 106 and have the ability, in addition to Internet access, to make use of the resources of the main STB 100 such as tuners, DVD player, PVR (hard disk) and the like. For example, the lady of the house could watch a DVD movie in the master bedroom, the DVD being inserted in the DVD reader of the main STB 100 using a client STB 114 connected to the bedroom TV. A child in room 1 may watch the "Disney channel" on his PC 120 while another may watch another show in room 2 on her PC 118. Simultaneously, another member of the household may view a business program recorded on the hard disk earlier during the day on a PC 112 in the study or home office or on a TV in the kitchen connected to a client STB 116. In each case, the activity is controlled directly at the client device 112, 114, 116, 118 or 120; that is, without having to stand in front of the main STB 100 with the (Infra-Red, for example) remote control.

According to the present invention, the client STB 114, 116 is a relatively uncomplicated device that is configured to accept digital video from the home network 106 and output the necessary video signal for viewing on a connected TV. In addition, the client STB 114, 116 may be configured to accept commands (issued from a local remote control) that will be executed by the main STB 100. Similarly, the client PC 112, 118, 120 may be configured as a standard PC having means to connect to the home network 106. Recent PCs are sufficiently powerful to decode and display by software high quality digital video such as MPEG1, MPEG2, MPEG4, HDTV and other video streaming formats such as RealVideo and Microsoft Media Player, for example. The main STB 100, therefore, may simply stream the requested video signal over the home network 106 for viewing on the client PC 112, 118, 120. The data rate capacity of current home network technology make possible the simultaneous handling of several video streams across the house.

Figure 3:
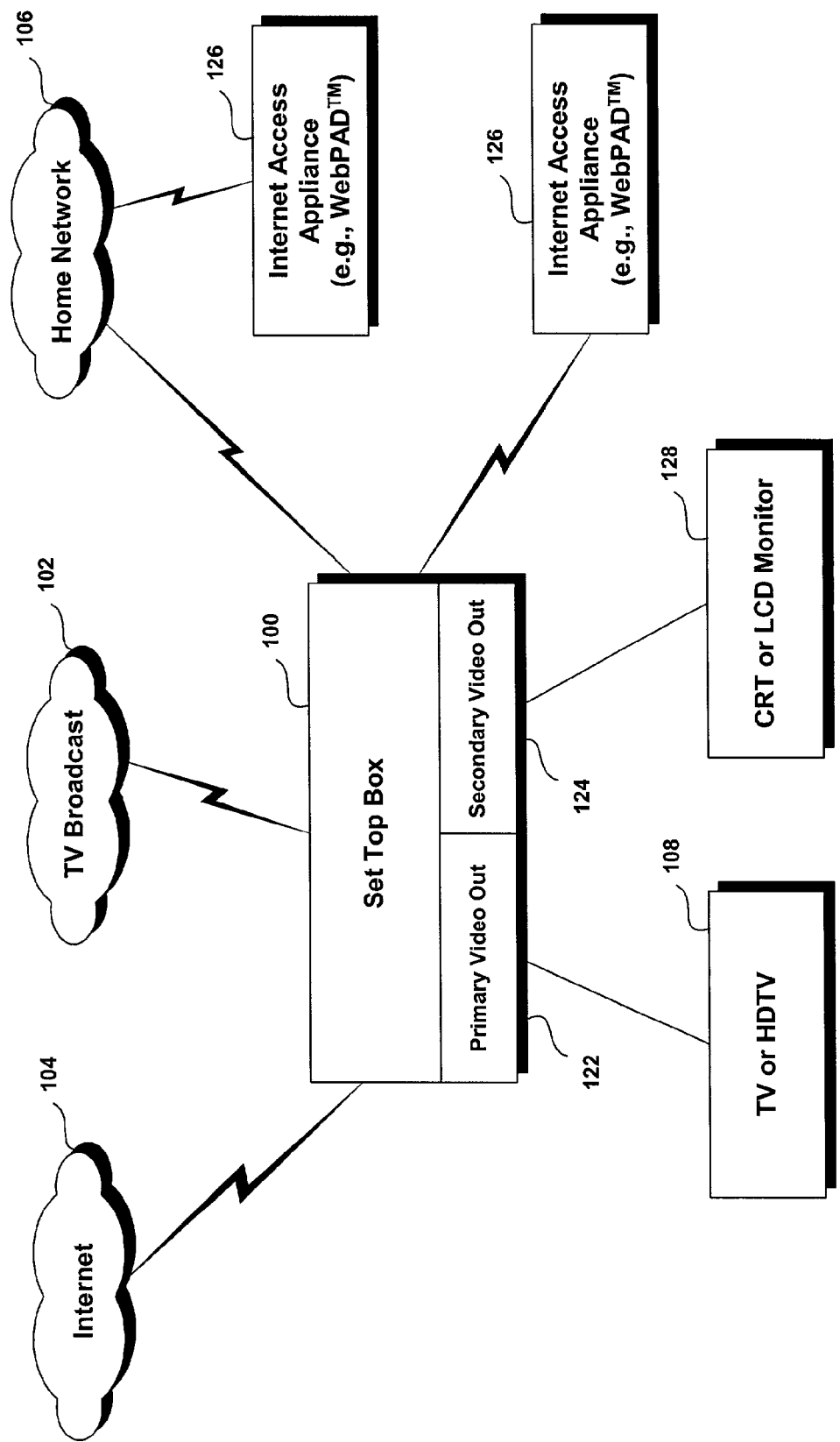
FIG. 3 is a block diagram of a multi-headed STB, according to an embodiment of the present invention.

FIG. 3 is a block diagram of a multi-headed STB, according to an embodiment of the present invention. As the cost of LCD monitors is rapidly decreasing and as the LCD the monitor may be located a maximum of about 10 meters from the graphics interface, the STB 100, 114, 116 according to the present invention may advantageously include a multi-headed graphics interface (together with a keyboard and mouse interface, or alternatively a touch screen with stylus capability, for example). The primary Video Out graphics interface 122 of the STB 100, 114, 116 may be dedicated to the TV or HDTV 108, and one or more Secondary Video Out graphics interfaces 124 may be dedicated to data displays for applications such as e-mail and Internet browsing. The secondary graphics head 124 in the STB 100, 114, 116 need not necessarily feature advanced 3D graphics and may, therefore, require only minimal computer and memory resource from the STB 100, 114, 116. A wired or wireless Web access device 126 such as Honeywell's WebPAD™ Internet Appliance may be connected to the house network 106 or directly to the Internet interface of the STB 100, 114, 116. This solution, however, is expensive as a complete CPU, memory, graphics, wireless network and power supply must be provided. The LCD monitor 128 directly connected to the secondary video out interface 124 of the STB 100, 114, 116 does not require such resources to be built-in.

Email and Web browsing via a conventional TV set are not comfortable for any sustained period of time because of the poor screen resolution and the perceptible flickering caused by the interlacing of the video frames. Therefore, an additional dedicated data display is highly desirable. A PC or a WebPAD™ connected to the home network 106 may provide the necessary comfort. However, these solutions require expensive hardware, as comprehensive computing resources are necessary (CPU, memory, network interface, graphics controller, display screen and power supply). Alternatively, a high-resolution data monitor (CRT or LCD) is significantly less expensive than a complete Internet access device such as WebPAD™ or a complete PC. Therefore, adding a second graphic controller 124 in the STB 100, 114, 116 to drive the data monitor together with some user interaction means is also highly desirable. Dual- or multi-headed and multi-headed graphics controllers are becoming available for PCs. Such technology may be readily and economically adapted for STBs 100, as the complexity of the necessary graphic controllers requires only fairly basic 2D functions (as opposed to more expensive 3D acceleration). An LCD monitor with a digital interface requires only minimal (and not intelligent) support electronics in addition to the LCD panel itself (such as a high speed Low Voltage Differential Signaling (LVDS) transmitter). Suitable monitor controllers are available from Silicon Image, Inc., whose Web address is www.siimage.com.

Figure 4:
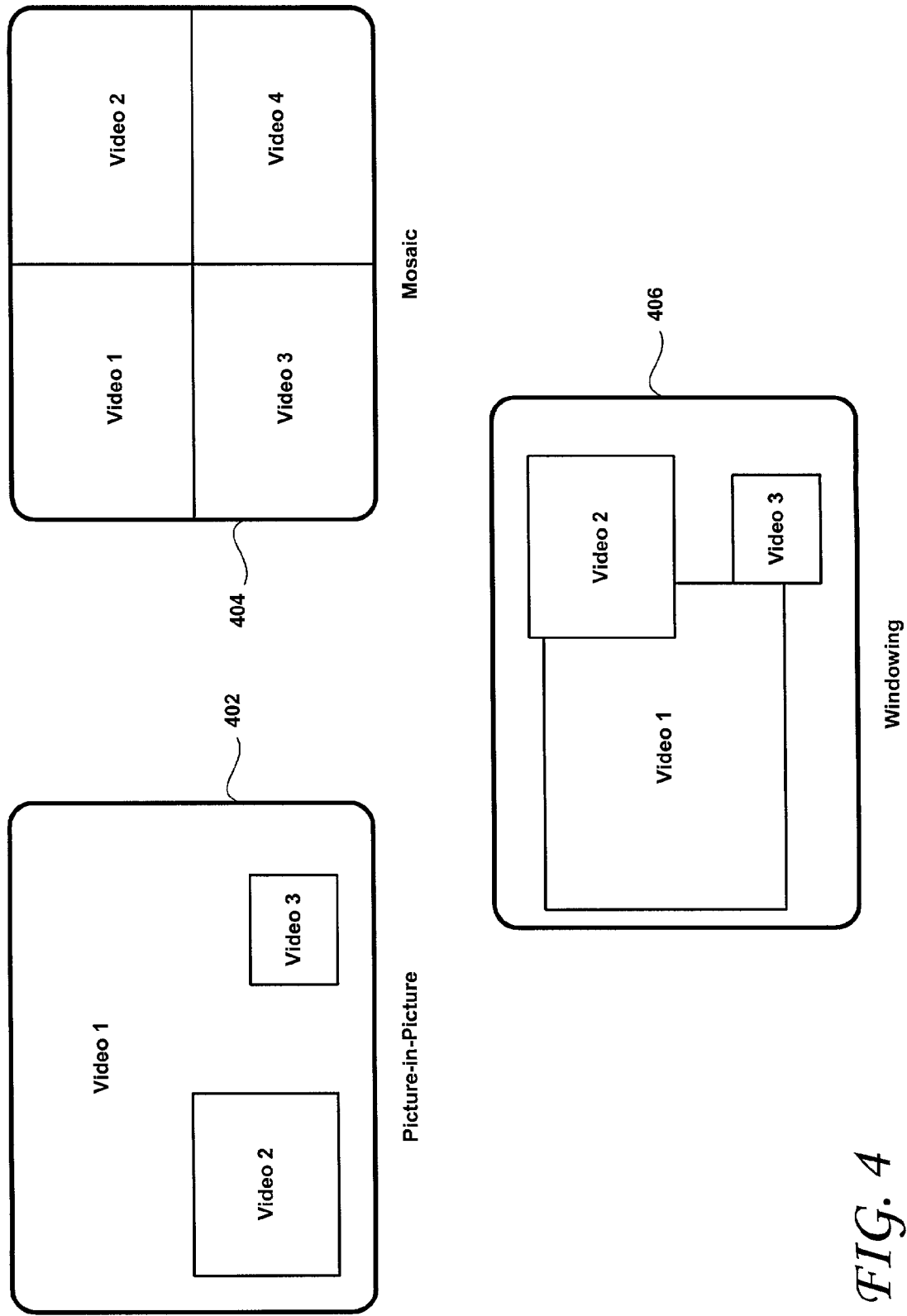
FIG. 4 is a diagram showing various viewing modes made possible by the multi-headed STB according to the present invention.

FIG. 4 is a diagram showing various viewing modes made possible by the multi-headed STB according to the present invention. With a STB 100 featuring a dual or multi-headed graphics controller, the user would typically view TV programs on the TV and/or HDTV set(s), and access the Internet for email and web browsing on the data display(s). However, nothing prevents the user from choosing to mix the various video and data sources to any of the attached displays or TV sets, and view them in full screen mode, in picture-in-picture mode as shown at 402, in mosaic mode as shown at 404 or in windowing mode, as shown at 406.

Figure 5:
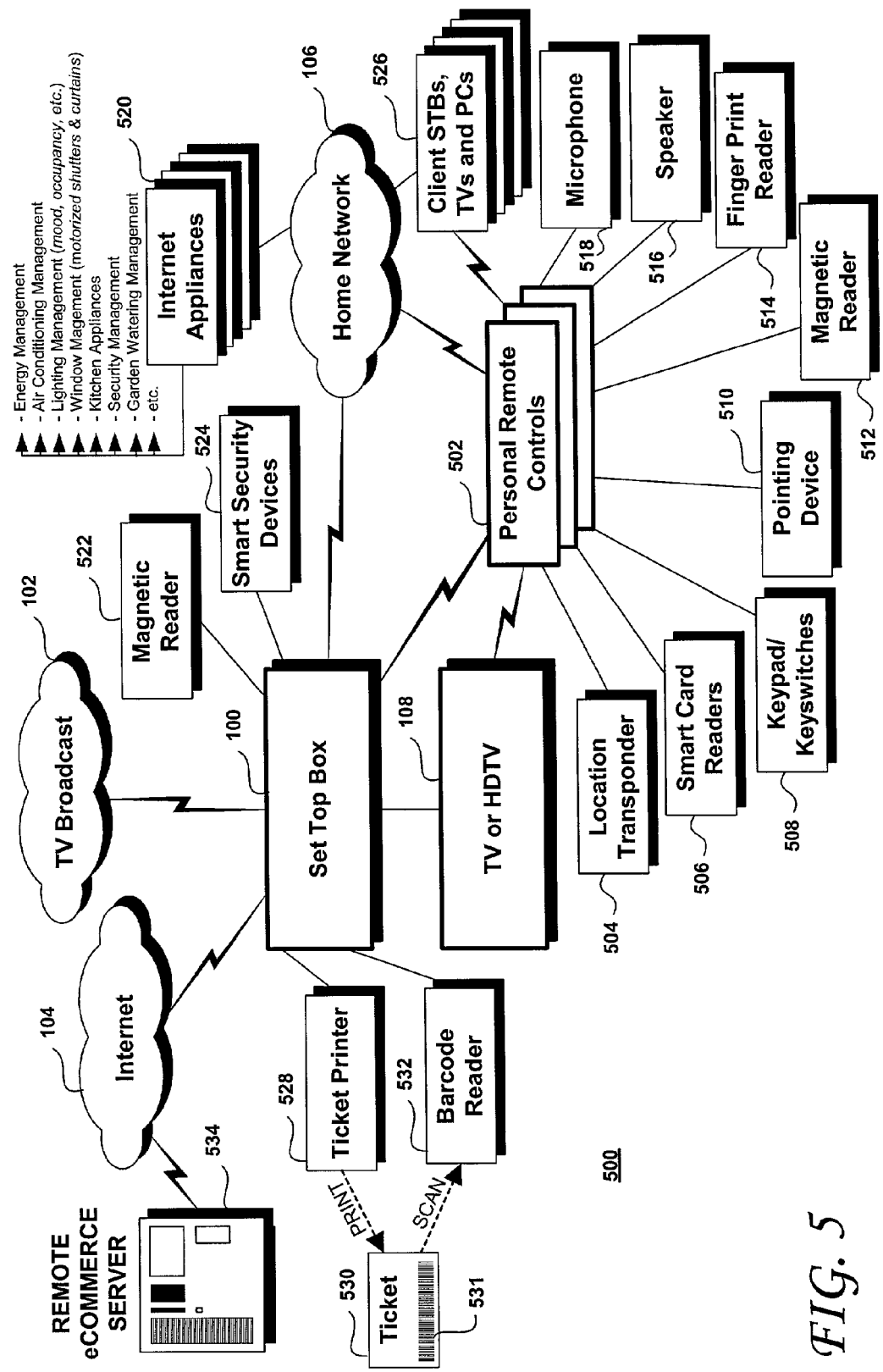
FIG. 5 is a block diagram of the universe of devices and networks with which the STB according to the present invention may communicate.

FIG. 5 is a block diagram of the universe 500 of devices and networks with which the STB 100, 114, 116 according to the present invention may communicate. The present STB 100, 114, 116 is capable of interfacing with a variety of devices connected directly thereto (such as a magnetic card reader 522 or smart security devices 524, for example), with a variety of networks (such as the Internet 104 and the home network 106, for example) as well as with a variety of other intelligent devices attached on the networks (such as Internet appliances 520 including, for example, Internet-connected devices for energy management, air conditioning and/or heating management, lighting management, security management, garden watering management, kitchen appliances and the like).

Figure 6:
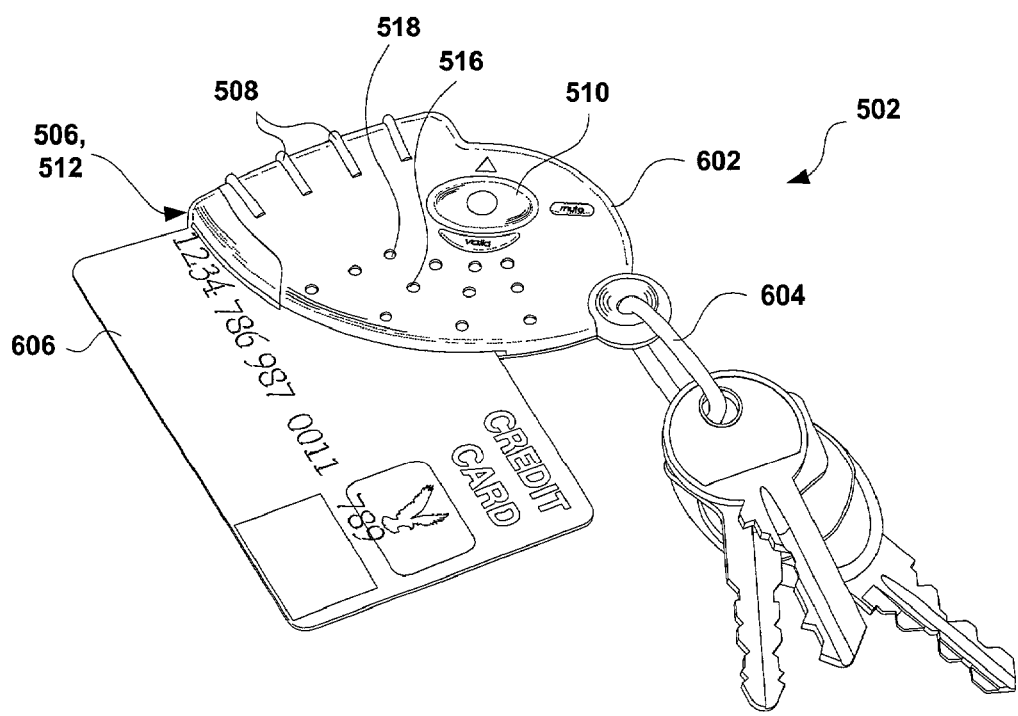
FIG. 6 is a top perspective view of a Personal Remote Control suitable for communicating with the STB of the present invention.
Figure 7:
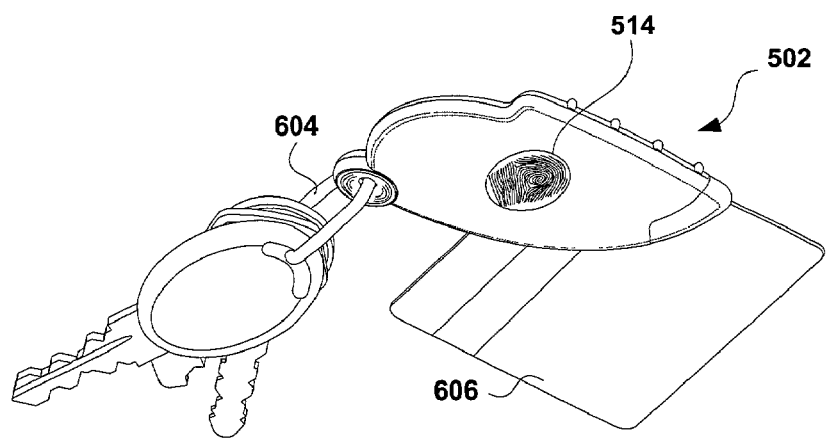
FIG. 7 is a bottom perspective view of a Personal Remote Control suitable for communicating with the STB of the present invention, showing the fingerprint reader feature thereof.

Palmtops, mobile phones and other access devices such as the WebPAD™ are ideal personal platforms to enable a home user to command the STB universe 500. The cost of acquiring many of these sophisticated control devices may, however, be prohibitive. Therefore, a more function-generic remote control platform is desirable. Accordingly, each member of the household may be given and carry a "Personal Remote Control" (an example of which is shown in FIGS. 6 and 7) that enables him or her to command all these devices while being automatically identified and cleared for access. Such a Personal Remote Control is shown in FIGS. 5, 6 and 7 and may include a keypad or key switches 508, a pointing device 510 (such as a trackball, for example), a smart card reader 506, a magnetic card reader 512, a fingerprint reader 514, a microphone 518, a speaker 516 and/or a location transponder 504, for example. Such a personal remote control may also communicate with and control one or more client STBs, TV and/PCs 526.

FIGS. 6 and 7 show top and bottom perspective views, respectively, of a Personal Remote Control 502 according to an embodiment of the present invention. The ornamental features of the Personal Remote Control are further disclosed in commonly assigned U.S. Design Pat. No. 29/119, 553 filed on May 8, 2001, the disclosure of which is incorporated herein by reference in its entirety. As shown in FIGS. 6 and 7, the Personal Remote Control 502 may be conveniently integrated with a key ring 604 and may be dimensioned so as to fit comfortably in the user's pockets. The Personal Remote Control 502 is shown in FIGS. 6 and 7 with a credit card 606 inserted within the magnetic/smart card reader 506, 512 for illustrative purposes only, it being understood that the credit card 606 forms no part of the present invention.

Figure 8:
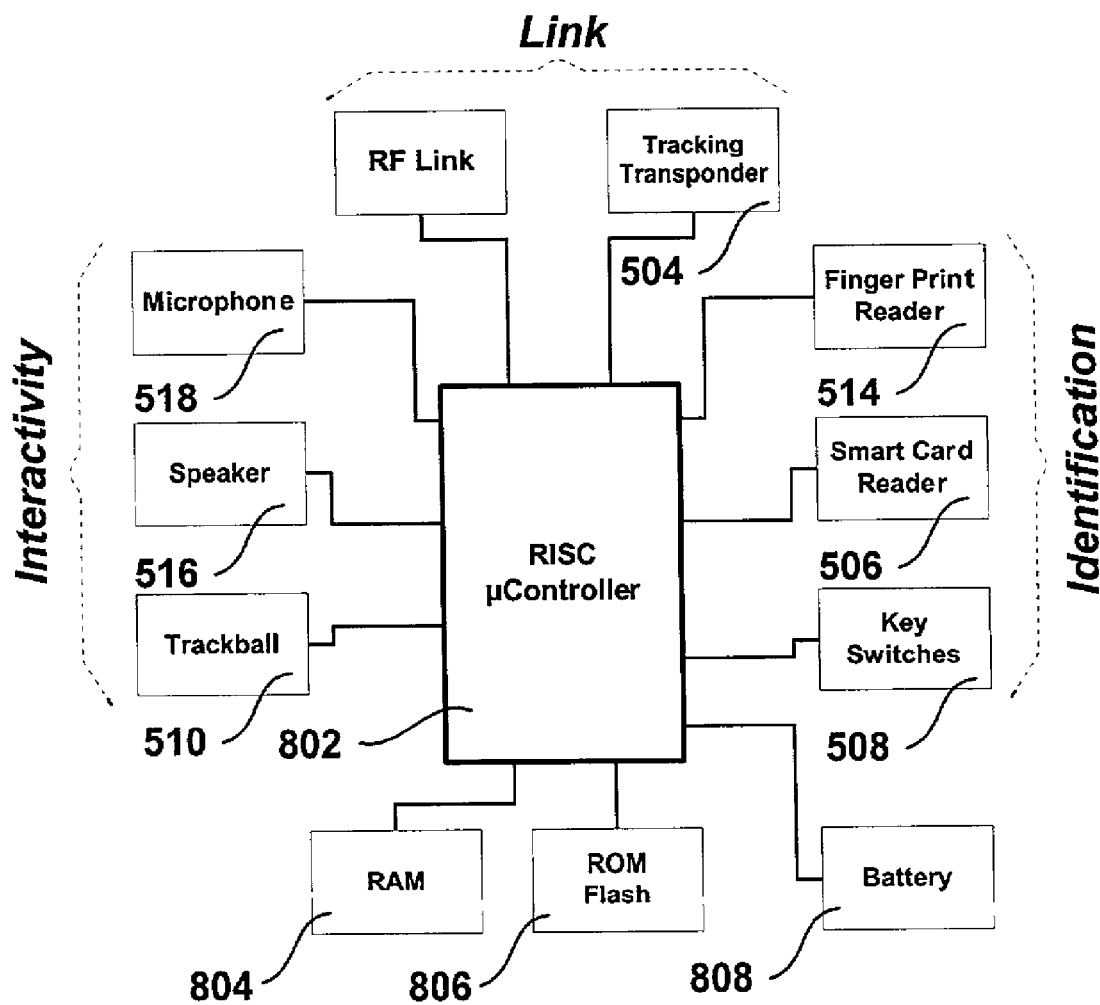
FIG. 8 is a block diagram of the top-level architecture of a Personal Remote Control, according to an embodiment of the present invention.

FIG. 8 is a block diagram of the top-level architecture of a Personal Remote Control 502, according to an embodiment of the present invention. The personal Remote Control 502 may be controlled by a Reduced Instruction Set (RISC) microprocessor equipped with Random Access Memory (RAM) 804, Flash Read Only Memory (ROM) 806 and a battery 808. Also coupled to the microprocessor 802 are a number of modules to establish the identity of the user, including, for example, a fingerprint reader 514, a smart card reader 506 and/or key switches 508 (the user may store a secret sequence of key presses), for example. A number of user-interactivity modules may also be coupled to the microprocessor 802 including, for example, a microphone 518, speaker 516 and/or a trackball 510. Other modules may include modules for linking the user with the STB 100, 114, 116 such as, for example, an RF link 810 and/or a tracking transponder 504.

The STB universe of FIGS. 2, 3 and 5 together with the means of identifying the user and accepting his credentials (personal, confidential and/or financial information, for example) is an ideal platform for conducting e-commerce transactions. However, in order to provide a platform suitable for conducting trusted and secure e-commerce transactions, the STB 100, 114, 116 preferably is augmented by a number of technologies that are discussed in detail herein below. Such technologies include an acknowledgment (ticket or receipt) printer, a barcode reader, a trusted cache, the execution protocol associated with such a trusted cache and a hardware random number generator.

Acknowledgment Printer

While PC users are very acquainted with storing and retrieving personal information pertaining to e-commerce transactions made on the Internet (such as the acknowledgement of an online purchase), non computer literate people may be lost when trying to follow the same procedure. Therefore, non-PC literate users will feel more comfortable if the STB 100, 114, 116 is capable of printing a detailed ticket such as a lottery ticket or such as those produced at the supermarket that show the items purchased. Therefore, the STB 100, 114, 116, according to an embodiment thereof, is coupled to or includes an integral ticket printer 528, as shown in FIG. 5. The printed ticket 530 generated by such a ticket printer 528 may display clear text information and/or a machine-readable code or indicia (such as a barcode 531) that uniquely identifies the transaction. The design of such a printer 528 (and that of the barcode reader discussed in detail below) may draw, for example, from aspects of the printers and scanners disclosed in commonly assigned and co-pending U.S. patent application Ser. No. 09/441,040 filed on Nov. 16, 1999 entitled "Compact Configurable Scanning Terminal" and Ser. No. 09/782,839 filed on Feb. 14, 2001 and entitled "Compact Document Scanner with Branding", the disclosure of each which is incorporated herein in its entirety.

Barcode Reader

Non computer literate users may also feel very comfortable and confident in presenting the ticket 530 in front of an illuminated window of a barcode reader 532 coupled to or integrated within the STB 100, 114, 116. Indeed, most everyone has had the experience of scanning bar-coded coupons (or at least witnessed cashiers doing the same) at a store cash register, or scanning tickets at the lottery counter to check their winnings. The barcode reader 532 (or other reader of machine readable information printed or otherwise present on the ticket 530), upon being presented with the printed ticket 530, may then display, cause the printer 528 to print or otherwise provide the user with the information related to the transaction on their TV 108 or computer monitor. Important printed tickets (of high value items, for example) may then be easily filed, as is often done will lottery receipts. Means to print a detailed ticket with machine-readable code as well as means to scan and decode the printed code are very desirable features to integrate on the STB 100, 114, 116. Thermal ticket printers as well as barcode scanners can be made very economically when integrated in the design of the set top box.

According to the present invention, the user may conveniently order a product by simply scanning the barcode 531 of a ticket 530 such as a promotion coupon found for example in his or her mailbox and confirming his or her intention to purchase the featured item. The STB software may then retrieve all the necessary personal user credentials (which includes all of the information that is necessary to complete an online transaction, such as ID, address, credit card details, etc.), commit the transaction to the remote e-commerce server 534 then print a receipt 530. Indeed, the ticket printer 528 of the STB 100, 114, 116 may print an acknowledgment, a receipt or most any hard copy, such as generically shown at 530 in FIG. 5. Likewise, the barcode reader 532 (which, it is to be understood encompasses readers of any type of machine or human readable information) may be configured to read not only tickets 530 printed by the ticket printer 528, but any compatible ticket, whether or not originally printed by the ticket printer 528. This allows the reader 532 to read promotional coupons and other items with machine readable indicia thereon.

Figure 9:
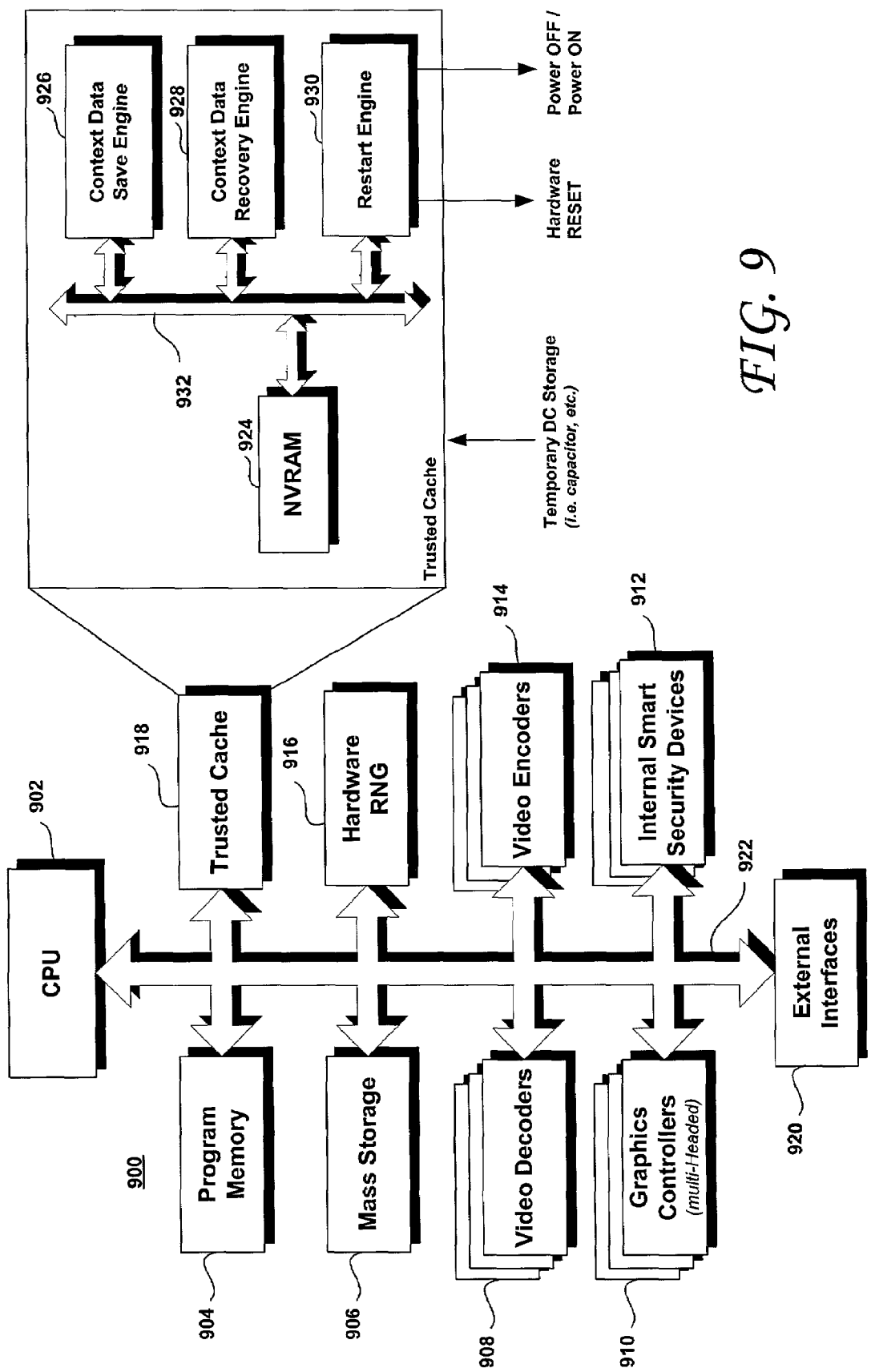
FIG. 9 is a block diagram of a controller for an STB and of a trusted cache memory, according to an embodiment of the present invention.

FIG. 9 is a block diagram of a controller 900 for an STB 100, 114, 116 and of a trusted cache memory 918, according to an embodiment of the present invention. The electronic controller 900 that controls the STB 100, 114, 116 may include Central Processing Unit (CPU) 902 with sufficient power for software decoding of streaming video, memory 904 for program execution, mass storage 906 (one or more magnetic hard disks or optical disks, for example) of sufficient storage capacity to store at least 30 hours of high-quality video, at least one video decoder 908 configured to decode MPEG2 and/or MPEG4 signals for example, at least one video encoder 914 configured to encode streams into the MPEG2 and/or MPEG4 formats, for example, a multi-headed graphics controller 910 (as discussed relative to FIG. 3, for example), at least one internal smart security device 912 and one or more interfaces 920 to the external world of the STB 100, 114, 116 as discussed relative to FIGS. 1-8. In addition, in order to provide a trusted platform for secure e-commerce transactions, the STB 100, 114, 116 may feature a trusted cache memory 918 (together with its associated execution protocol) to automatically recover from a temporary failure and a hardware random number generator (RNG) 916 for generating true random numbers for maximum entropy encryption keys. Each of the elements 902, 904, 906, 908, 910, 912, 914, 916, 918 and 920 are advantageously coupled to one another via a common bus structure, as shown at reference 922.

Trusted Cache

As shown in FIG. 9, the trusted cache 918 of the present invention may include a Non-Volatile Random Access Memory (NVRAM) 924 such as a "battery backed up" static memory or "Flash backed up" static memory (for example). The trusted cache 918 may also include a Context Data Save Engine 926 that is adapted to save the state and context of the current transaction being executed from the program memory 904 (Dynamic or Static RAM) into the NVRAM 924 as soon as power failure is sensed. A Context Data Recovery Engine 928 may then restore the transaction execution context from NVRAM 924 back into the DRAM or SRAM 904 as soon as the power supply is properly restored. The restart engine 930, according to an embodiment of the present invention, may be configured to drive a power ON signal even when the main power is cut or removed, using electrical energy supplied by a temporary DC storage device such as a capacitor or a small battery. The trusted cache 918 may be used to continually store the critical states of a transaction session (such as an e-commerce transaction session, for example) into non-volatile memory 924. Moreover, the context data save engine 926 enables automatic recovery of transaction execution following a temporary failure; that is, a software crash, a hardware latch-up or an accidental power-off, for example. Preferably, the critical states of the transaction are written to the trusted cache 918 without delay and very frequently, and are retained in non-volatile memory 924 in case of temporary failure of the STB, either due to power outage, software crash, hardware latch-up or simply accidental user initiated power down.

Saving such critical states on media such as a magnetic hard disk is believed to be too slow and too unreliable. Likewise, saving the critical states on Flash Memory is also believed to be too slow, and the writing life may be too limited (such as on the order of 100,000 to 1 million cycles, for example). The cache technology for the trusted cache 918, therefore, is preferably chosen from either non-volatile SRAM or magnetic core memory, for example. Battery or capacitor backed-up SRAM may be included in the trusted cache 918, but the battery life and reliability may become problematic, and capacitor retention may be unduly limited (to a period of only a few days, for example). A technology that is well suited for the trusted cache 918 is the NVRAM technology developed by Simtek, Inc. (www.simtek.com). Using such NVRAM technology, the entire content of the program memory 904 (DRAM or SRAM) is automatically copied into in Flash memory at once, as soon as a catastrophic failure is detected. Moreover, no external electrical source is required to retain the data stored in the trusted cache's NVRAM 924 and data retention is guarantied for at least 10 years. When power is reapplied, the content of the Flash memory may be automatically rewritten into the program memory 904 (which may include SRAM and/or DRAM) and ready for access. The critical states saved to the NVRAM 924 of the trusted cache 918 may be encrypted to prevent tampering during the transaction recovery process.

Random Number Generator

A hardware RNG such as shown at 916 in FIG. 9 is extremely desirable in order to ensure maximum entropy of encryption of encryption keys such that the encrypted keys are formed of true random bits, thereby rendering a brute force attack thereon to its maximum theoretical level of difficulty.

An embedded true RNG based on diode noise, for example, enables systematic use of the highest encryption strength for the encryption algorithms and key length allowed by government. Flaws in RNGs and badly chosen encryption keys are responsible for highly publicized cracked systems such as Netscape Navigator 1.1, European GSM phones, Russian systems, etc. Although 128-bit encryption such as RSA, 3DES, etc requires a considerable theoretical computer power to crack, a badly chosen encryption key may result in the secret keys being cracked within hours.

Because of all the sensitive and personal data that home users may have on their PCs and other devices connected to the Internet and/or to other networks via the home network (for example), there is a need to provide STBs 100 with almost "Military Defense class" security. Virtual Private Networks (VPNs), Secure Socket layer (SSL) and other secure communication protocols that rely on locally generated encryption keys are solutions that are widely available today. The resilience of such encryption protocols to attack depend on the quality of the encryption keys or their maximum entropy, such as discussed in Schneider, *Secrets and Lies: Digital Security in a Networked World*, Wiley& Sons, Inc.© 2000, pages 102-106, which is incorporated herein by reference.

Trusted E-Commerce Transactions

It is generally recognized that the reliability of embedded computing hardware such as STBs 100 and other Internet Appliances such as shown at 520 is far greater than the reliability of the Internet 104 and of wireless networks. The Internet 104 is a very cost effective medium for viewing rich information and for performing purchases in a secure manner, using smart cards and encryption techniques, for example. However, the availability of the Internet 104 is often unpredictable. Furthermore, an e-commerce transaction may take minutes to complete and any failure between the STB 100, 114, 116 and the remote e-commerce server 534 may leave the transaction in an unknown state and the user frustrated or mislead.

The present invention, therefore, offers methods, systems and e-commerce transaction models for conducting trusted e-commerce transactions via a STB 100, 114, 116 according to the present invention, whereby the e-commerce transaction is performed in seconds or even fractions of seconds. Moreover, the user of the present invention need not be concerned by the possible failure of the transaction commit to the remote server 534. Moreover, deployment of very large numbers of such STB 100, 114, 116s according to the present invention (such as 10 millions units), will not slow the connected e-commerce remote server or servers 534 to a crawl when all the STB 100, 114, 116s are committing transactions simultaneously because of a particular event. The remote servers 534 may be configured to accept the transactional model and easily handle a transaction volume on the order of 1,000,000 transactions per second. A suitable remote server is described in commonly assigned U.S. application Ser. No. 09/565,579 filed on May 4, 2000 and entitled "Fast Web Interface Server, Network Architectures and Systems Using Same", the disclosure of which is incorporated herewith in its entirety.

The e-commerce transactions described herein are an effective and low cost way to provide ultra fast and secure micro-payment or e-microcommerce (wherein the terms refers to low valued and/or frequent transactions—although the applicability of present invention is not limited to such micro-transactions) solutions for a multitude of competitive providers (with whom the user need not necessary have an open account). Such e-microcommerce transactions may include transactions related to on-demand music listening or delivery, on-demand HDTV music video clips or concerts, charm videos, magazine articles, betting, casino gambling, and voting, to name only a few representative candidates for such a micro-payment model.

"Provisional" and "Confirmed" Receipts

The transactional model proposed herein for conducting trusted e-commerce transactions via the STB 100, 114, 116 of the present invention is applicable to transactions such as occur in large lotteries, whereby the STB 100, 114, 116 is the transaction "master".

Figure 10:
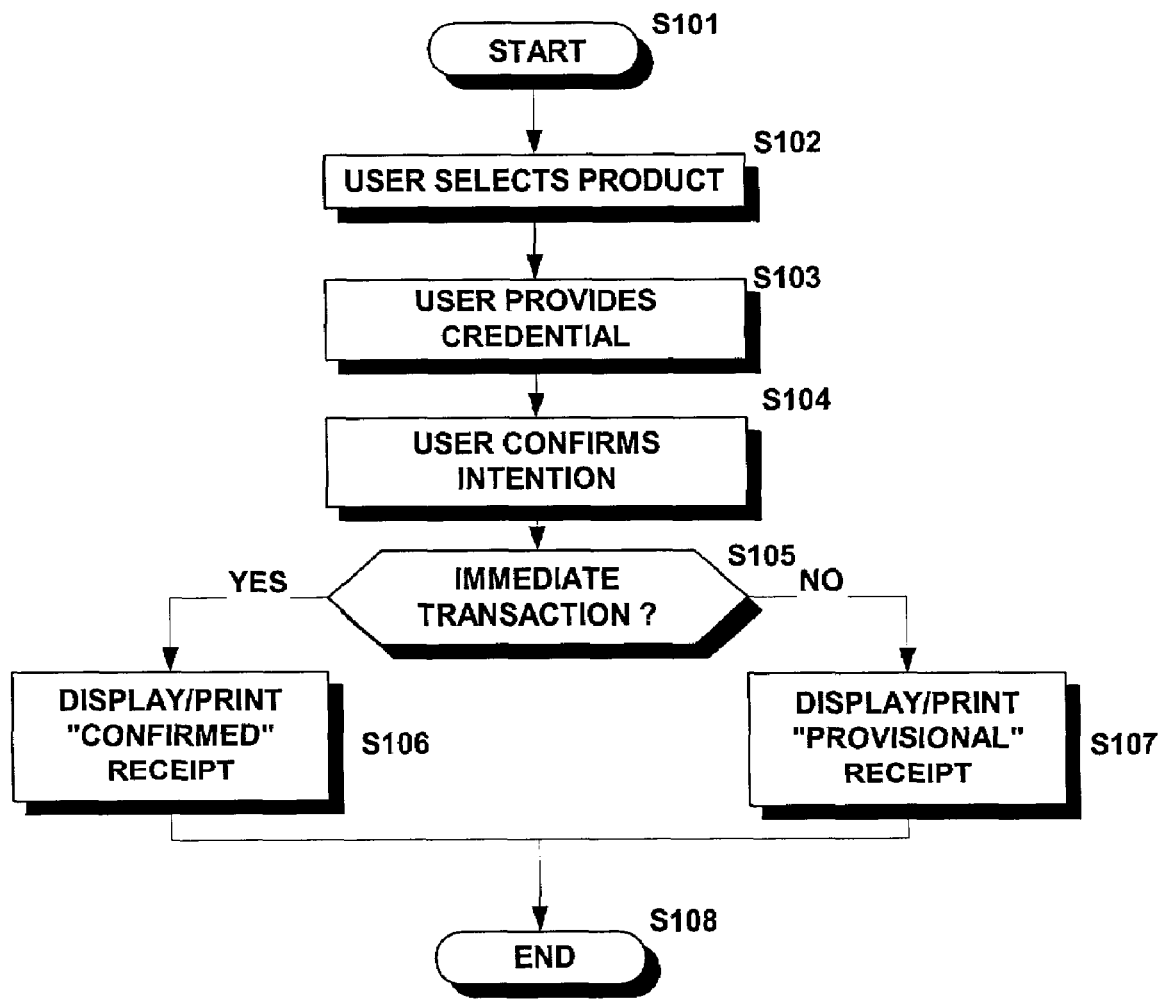
FIG. 10 is a flowchart of a transactional model for providing "Provisional" and "Confirmed" receipts of a trusted e-commerce transaction, according to an embodiment of the present invention.

FIG. 10 is a flowchart of a transactional model for providing "Provisional" and "Confirmed" receipts of a trusted e-commerce transaction, according to an embodiment of the present invention. As shown therein, the transaction starts at S101 and the user (not shown) of the STB 100, 114, 116 selects (using his or her Personal Remote Control 502, for example) a product and/or services (displayed on the TV 108 or a monitor of a client PC 112, 118 or 120, for example) provided by provider of such products and/or services, as shown at S102. At S103, the user provides any requested credentials, such as any requested and/or required authentication and/or payment instrument information, as shown at S103. The user may then be presented with an opportunity to confirm the selected product(s) and/or services at S104.

Transactions that are accepted by the remote server 534 in a predetermined and/or selectable short period of time (such as on the order of 1 second for example) are named "immediate transactions" herein. When it is determined at step S105 that the current transaction is an immediate transaction (such as when a transaction confirmation is received from the remote server 534 within the predetermined and/or selectable short period of time), the user is given a "confirmed acknowledgement" (receipt or ticket, as the terms acknowledgment, receipt and ticket are used interchangeably herein) as shown at S106. When immediate transactions are not possible (such as when a transaction confirmation is not received from the remote server 534 after expiry of the predetermined and/or selectable short period of time), the user is given a "provisional acknowledgment" or receipt, as shown at S107. The transaction may then end at S108. If the user has received a provisional acknowledgment, the user may request a confirmed acknowledgment at some later point in time, if the user so desires. Very quickly, the user will trust the reliability of the transaction strategy proposed herein, and will not bother to systematically request a confirmed acknowledgement/receipt when a provisional receipt has been issued. If in doubt, the user always has the option and ability of requesting a confirmed acknowledgement/receipt.

In the case of non-immediate transactions according to the present invention, the actual time to complete the overall transaction is preferably masked from the user. The user (person initiating the transaction) remains satisfied with the transaction because of the short period of time needed to complete the transaction. The reliability and the speed of completion of the overall transaction is insured by relying on the "transaction master" model and the use of the trusted cache 918, as disclosed herein.

Immediate Transaction

Figure 11:
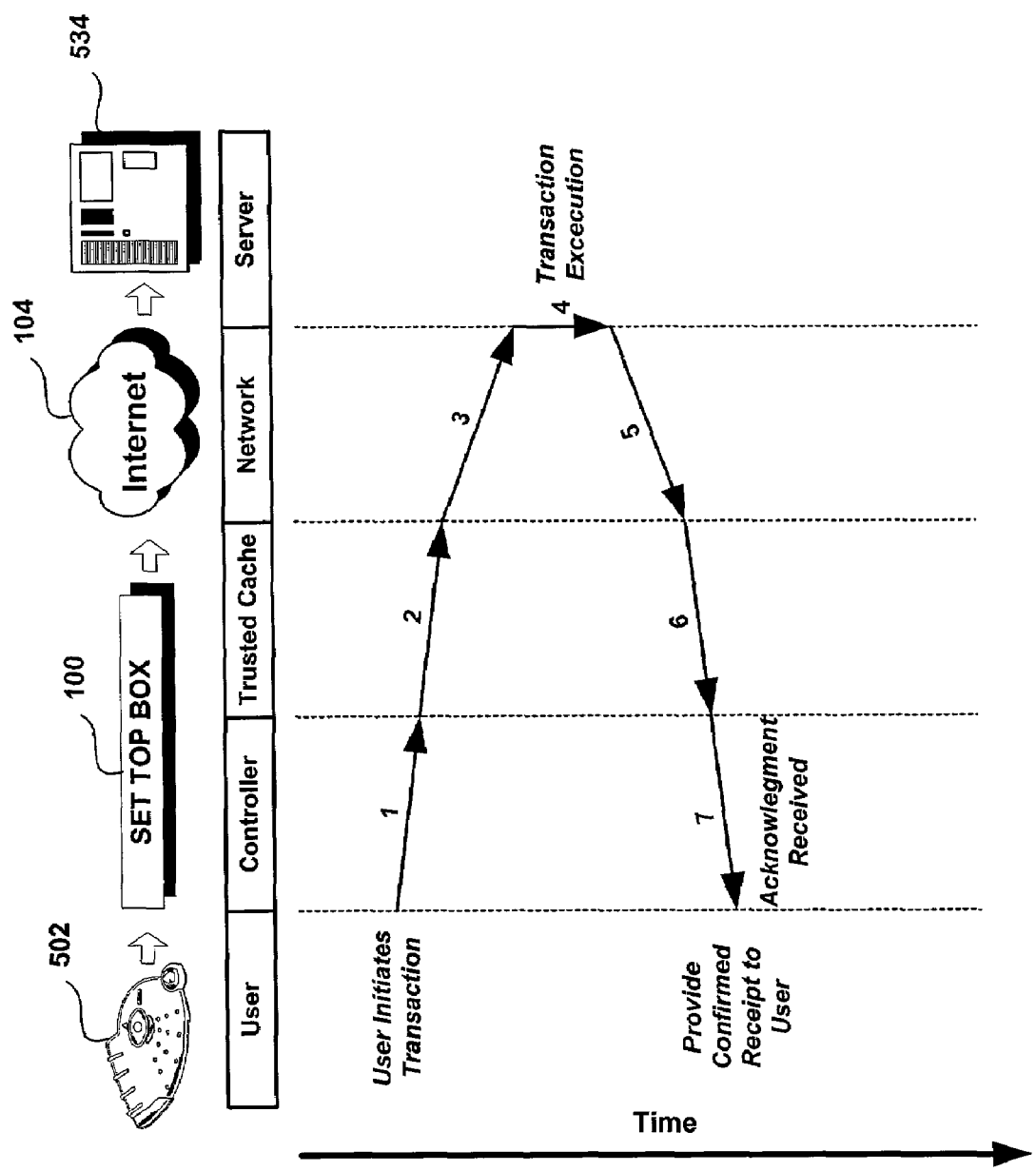
FIG. 11 is a diagram showing the timing of an immediate trusted transaction, according to an embodiment of the present invention.

FIG. 11 is a diagram showing the timing of an immediate trusted transaction as the transaction progresses from the user to the server 534 and back to the user, as a function of time, according to an embodiment of the present invention. When an immediate transaction is possible, the transaction may proceed as follows. When initiating a transaction, the user may supply one or more of the following: an identification of the desired product and/or service, the identity of the supplier(s), the user's personal information and/or payment instrument information (which may be inputted by the user or retrieved automatically from secured personal storage—such as from the Personal Remote Control 502), for example. As shown at (1), the controller 900 of the STB 100, 114, 116 according to the present invention may encapsulate all the user-supplied aforementioned information in a single data packet (all such sensitive data being preferably secured in accordance with a predetermined security/encryption protocol), and may then store a copy of the packet into the trusted cache 918, as shown at (2). The packet may then routed through the network (3) (including, for example, the Internet 104) until it reaches the remote server 534. The information related to the item(s) chosen, together with the personal information and/or payment instrument information and the delivery address are preferably sent to the remote server 534 in the same single data packet. The sensitive information may be encrypted using, for example, the provider's public key that is automatically made available together with the rich content describing the product or service, thereby avoiding the unnecessary overhead of establishing a full SSL or Transport Layer Security (TLS) session. The remote server 534 may then complete the transaction (4) and may return a confirmed acknowledgment packet back through the network (5). A copy of the returned confirmed acknowledgment packet may then be copied to the trusted cache 918 (6), and a receipt 530 may be generated by the STB 100, 114, 116 (7) that is then displayed or printed or otherwise provided to the user.

Cached Transaction

Figure 12:
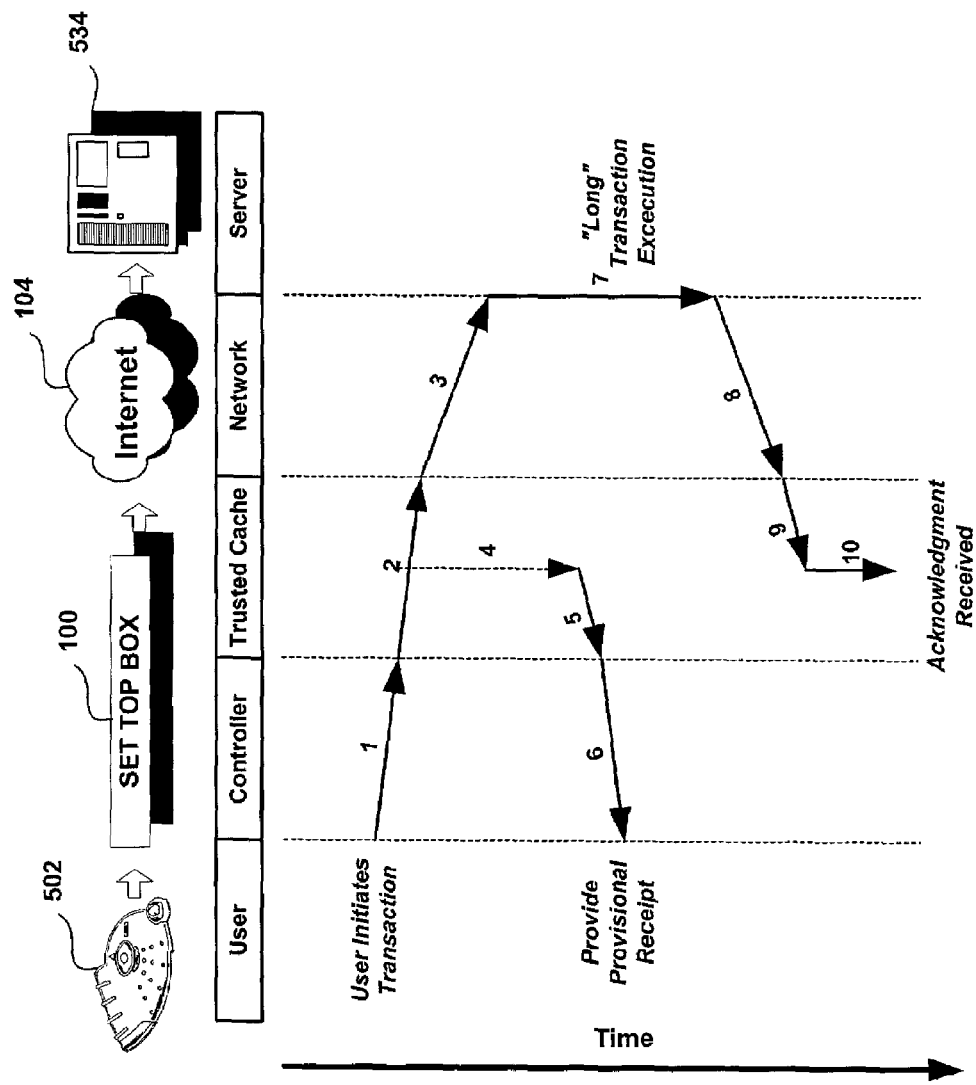
FIG. 12 is a diagram showing the timing of a cached trusted transaction as the transaction progresses from the user to the server and back to the user, as a function of time, according to an embodiment of the present invention.

When an immediate transaction is not possible, a cached transaction is executed. FIG. 12 is a diagram showing the timing of a cached trusted transaction as the transaction progresses from the user to the server 534 and back to the user, as a function of time, according to an embodiment of the present invention. When initiating a transaction, the user of the STB 100, 114, 116 supplies one or more of the following: an identification of the desired product and/or service, the identity of the supplier(s), the user's personal information and/or payment instrument information (which may be inputted by the user or retrieved automatically from secured personal storage such as the Personal Remote Control 502), for example. The STB 100, 114, 116, as shown at (1), may the encapsulate all of the aforementioned information in a single data packet (all such sensitive information being secured in accordance with a predetermined security/encryption protocol), and may then store a copy of the packet in the trusted cache 918 (2). The packet may then be routed through the network (3) (including, for example, the Internet 104).

After a predetermined time-out (4), a provisional acknowledgement packet (5) is produced based on the user transaction request already committed to the trusted cache 918. The STB 100, 114, 116 of the present invention may then generate a provisional acknowledgement (6) such as ticket 530 that is viewed or printed by the ticket printer 528 or otherwise made available or provided to the user.

After a certain amount of time, the remote server 534 completes the transaction (7) and may return a confirmed acknowledgment packet back through the network (8). A copy of the returned confirmed acknowledgment packet may then be copied to the trusted cache 918 (9), and the confirmed acknowledgment may be retained in the trusted cache 918 (10). This execution flow has the advantage of providing the user with a provisional acknowledgment very shortly after the user has initiated the transaction, even if a confirmed acknowledgment is not available until some later time. The user retains the option of returning to the STB 100, 114, 116 of the present invention and requesting a confirmed acknowledgment corresponding to the previously provided provisional acknowledgment by presenting the provisional acknowledgment or ticket to the barcode reader 532. The barcode reader 532 may then read the barcode 531 printed on the acknowledgment 530 and the STB 100, 114, 116 may then cause the ticket printer 528 to print out a confirmed acknowledgment 530.

Failed Transaction

Figure 13:
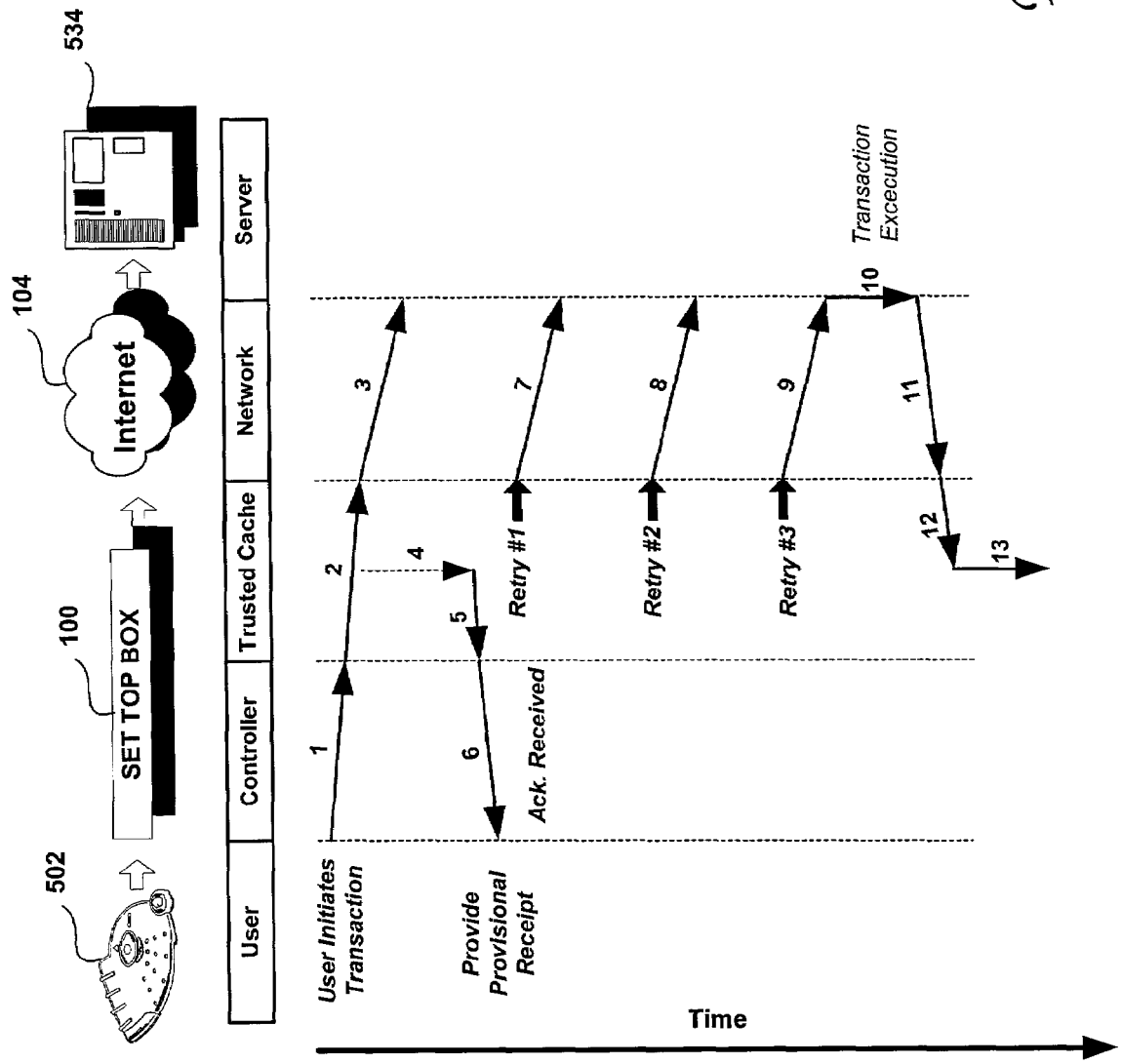
FIG. 13 is a diagram showing the timing of a failed trusted transaction, according to an embodiment of the present invention.

FIG. 13 is a diagram showing the timing of a failed trusted transaction as the transaction progresses from the user to the server 534 and back to the user, as a function of time, according to an embodiment of the present invention. When initiating a transaction, the user may supply one or more of the following: an identification of the desired product and/or service, the identity of the supplier(s), the user's personal information and/or payment instrument information (which may be inputted by the user or retrieved automatically from secured personal storage), for example. The STB 100, 114, 116 (the controller 900 thereof) may then encapsulate all of the aforementioned information in a single data packet (all such sensitive information being secured in accordance with a predetermined security/encryption protocol) as shown at (1), and may then store a copy of the packet in the trusted cache 918 (2). The packet may then be routed through the network (3) (including, for example, the Internet 104).

After a predetermined time-out (4) has elapsed without the generation of a confirmed acknowledgment packet by the server 534, a provisional acknowledgement packet (5) may be produced by the STB 100, 114, 116 itself, based on the user transaction request already committed to the trusted cache 918. The STB 100, 114, 116 of the present invention may then generate a provisional acknowledgement (6) such as the ticket 530 that is viewed or printed by the ticket printer 528 or otherwise made available or provided to the user.

When the cached transaction packet (3) fails to reach the remote server 534, a first re-try packet (7) is sent (under the control of the STB 100) through the network after a predetermined and/or selectable period of time. If no acknowledgement is received from the remote server 534 after a predetermined and/or selectable period of time, a second retry packet (8) is sent to the network. The same scenario may be repeated forever or (preferably) for a selectable number or retries or period of time or until an acknowledgement is received from the remote server 534.

In the example illustrated in FIG. 13, the third retry packet (9) reaches its destination (the remote server 534) and the transaction is successfully executed (10). A confirmed acknowledgment is routed back through the network (11). A copy of the returned acknowledgment packet is copied to the trusted cache 918 (12), and a confirmed acknowledgment may be retained in the trusted cache 918 (13) and optionally provided to the user upon request.

Such a transaction model, whereby the STB 100, 114, 116 is the transaction "master" that initiates the transaction with the remote server 534 and repeats forever or for a predetermined number of times until a valid transaction acknowledgment from the remote server 534 is received, is extremely robust albeit lightweight (the transaction consists of single forward packet and a single return packet). This enables the remote server 534 to handle a great many such transactions simultaneously without becoming overwhelmed by the data traffic necessary to complete such a great number of transactions. Moreover, there is no need to identify the exact location and type of failure or to initiate a specific recovery. Indeed, any failure, whether on the outbound network path (i.e., toward the remote server 534), at the remote server 534 or on the network return path (from the remote server 534 back toward the STB 100, 114, 116/user) may be automatically recovered according to this transaction model. Any duplicate packet that may be received at either end may simply be ignored.

It is to be noted that the user is not aware of the possible delay in receiving the acknowledgement from the remote server 534. This feature is expected to be appreciated by users, especially when performing numerous micro-payments, as servers conventionally take a long time to get approval from clearing banks.

Confirmed Acknowledgment Request

Figure 14:
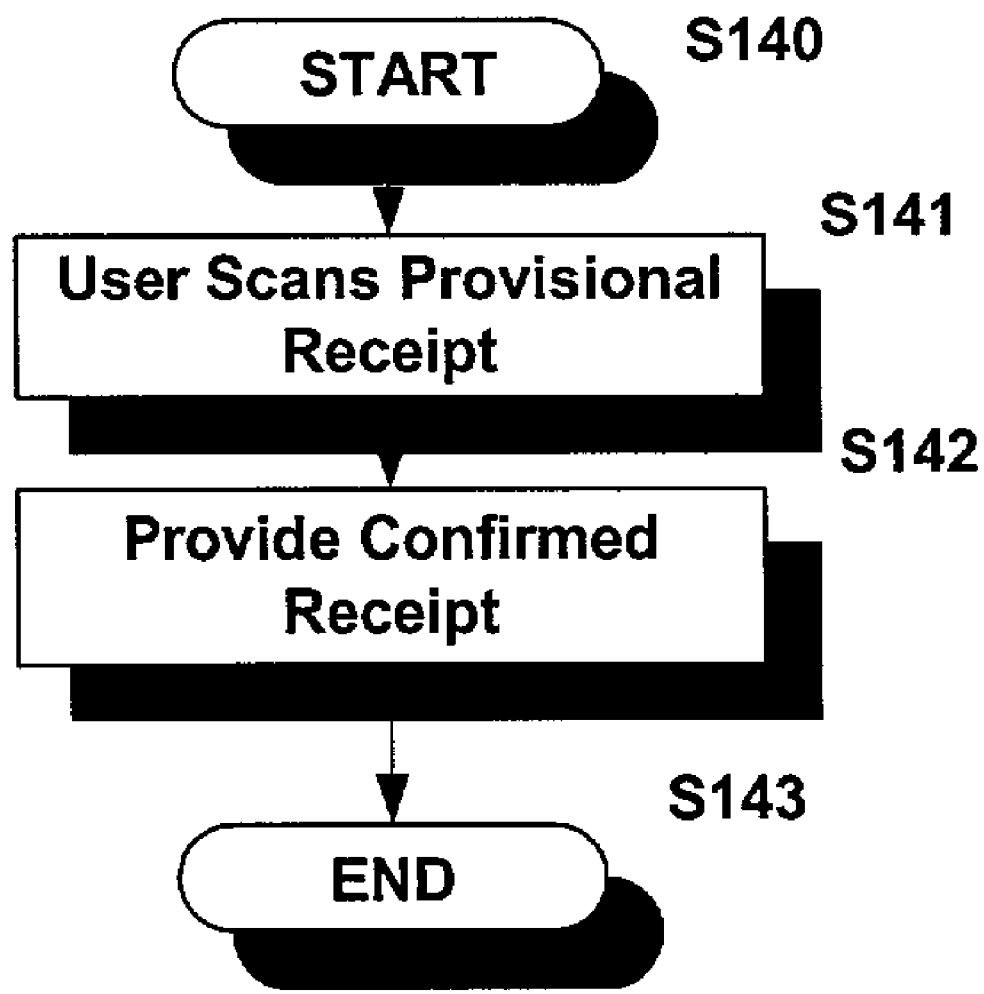
FIG. 14 is a flowchart of a request for a confirmed acknowledgment, according to an embodiment of the present invention.

FIG. 14 is a flowchart of a request for a confirmed acknowledgment, according to an embodiment of the present invention. Whenever the user is given a provisional acknowledgment, the user may, at some later time, request a corresponding confirmed acknowledgment. If the STB 100, 114, 116 according to the present invention is equipped with a ticket or receipt printer 528 and a barcode reader (such as a scanner, for example) 532 (or other machine vision system), the user may initiate a request for a confirmed acknowledgment at S140 in FIG. 14 by simply presenting the previously received provisional acknowledgment to the bar code reader 532 and scan a barcode 531 (or other machine readable indicia) printed on the provisional acknowledgment as shown at S141 and the device 528 prints out a confirmed acknowledgment (a ticket or receipt) as shown at S142 to complete the request at S143, in accordance with the procedures detailed below.

"In-Cache" Confirmation Transaction

Figure 15:
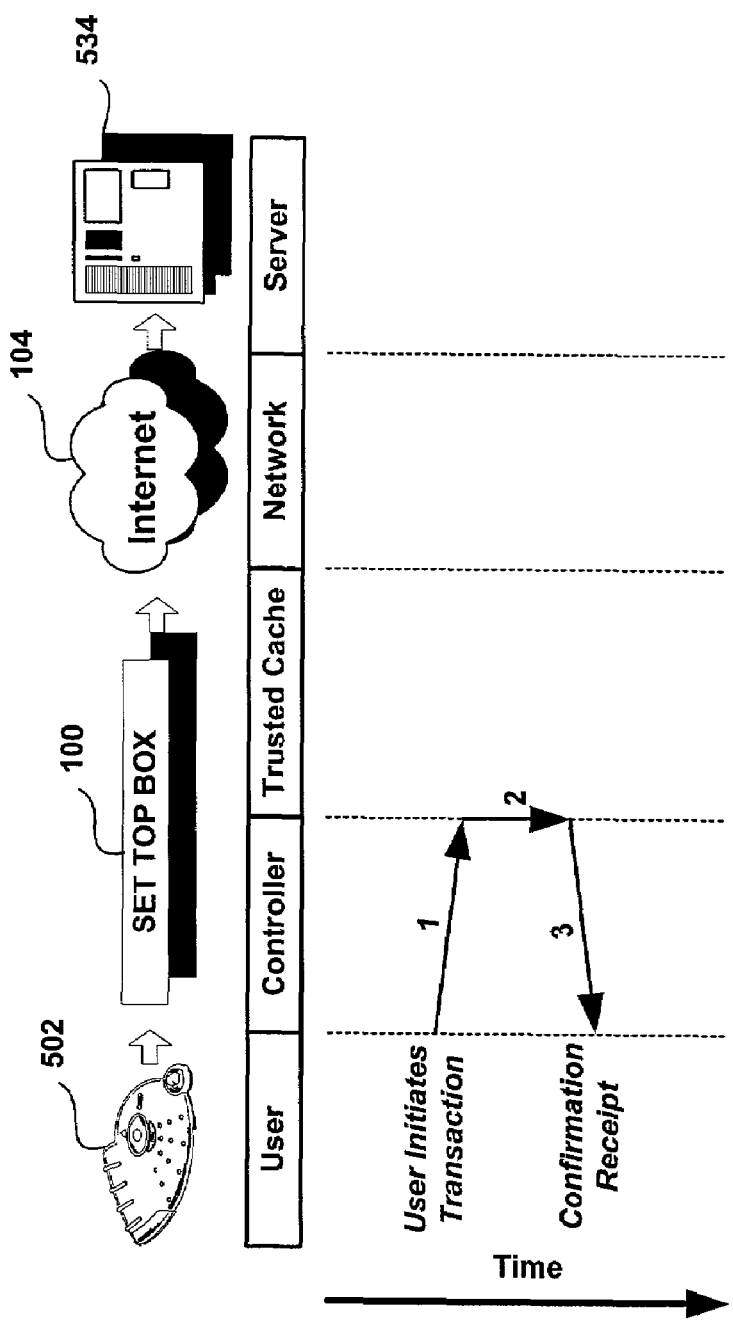
FIG. 15 is a diagram showing an in-cache confirmation of a trusted transaction, according to an embodiment of the present invention.

FIG. 15 is a diagram showing an in-cache confirmation of a trusted transaction, according to an embodiment of the present invention. Depending on the time taken by the remote server 534 to complete the transaction, the confirmed acknowledgment may already be available in the trusted cache 918. In that case, the user need only present the previously received provisional acknowledgment to barcode reader 110 of the kiosk 100, of the present invention and the request (1) may be immediately responded to with the relevant data contained in the trusted cache 918 (2), and a confirmed acknowledgment generated (3) and printed, displayed or otherwise made available to the user.

"Out-of-Cache" Confirmation Transaction

Figure 16:
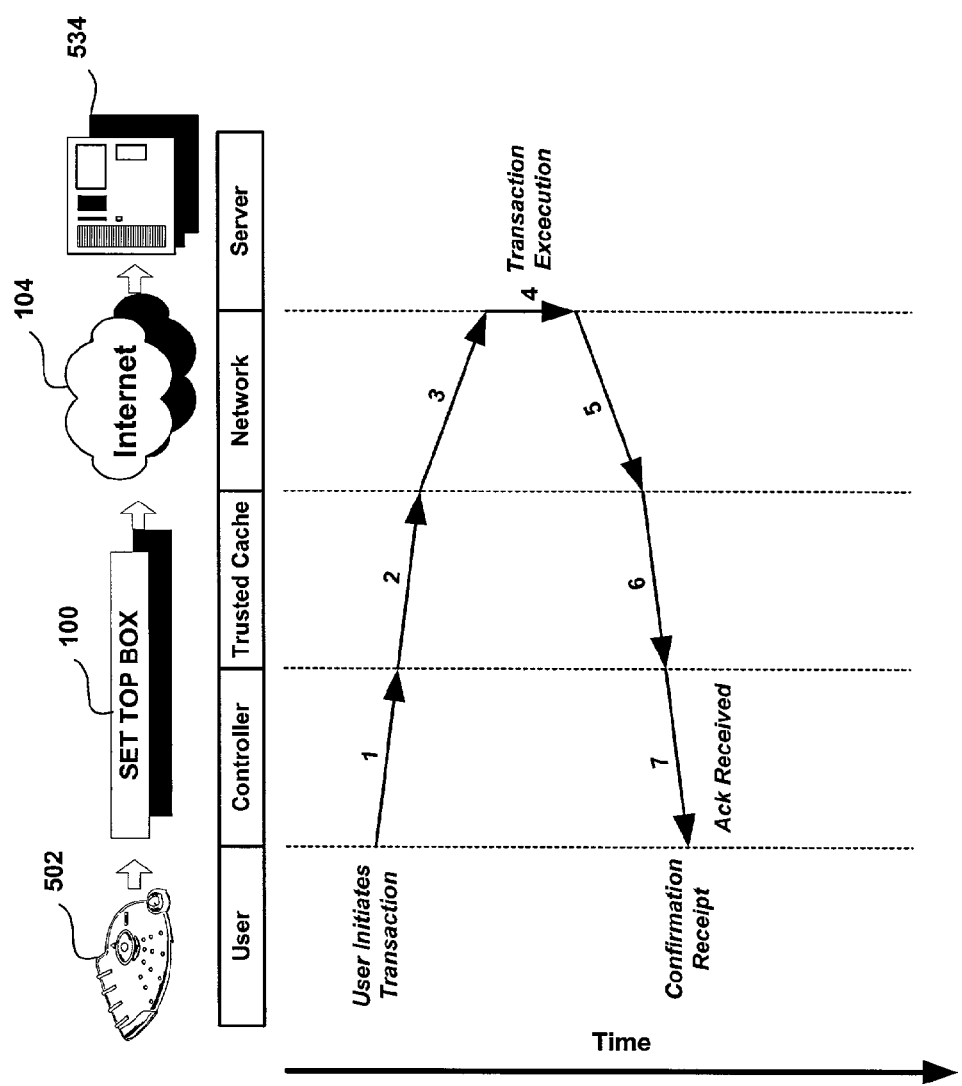
FIG. 16 is a diagram showing the timing of an out-of-cache confirmation of a trusted transaction, according to an embodiment of the present invention.

FIG. 16 is a diagram showing the timing of an out-of-cache confirmation of a trusted transaction, according to an embodiment of the present invention. If the confirmed acknowledgement is not present in the trusted cache 918 (for whatever reason), the request therefor is forwarded to the remote server 534 via the outbound path (1) (2) and (3) through the controller 900, trusted cache 918 and the network (such as the Internet 104), whereupon the remote server 534 sends back a transaction confirmed acknowledgment (4) that is routed back to the STB 100, 114, 116 via the return path (5) (6) and (7). If the remote server 534 does not respond due to some failure along the way, the STB 100, 114, 116 of the present invention may continuously repeat the request for confirmed acknowledgment until a reply is received. When the remote server 534 has completed the earlier-initiated e-commerce transaction, it will cache the confirmed acknowledgment such that a subsequent request from the STB 100, 114, 116 can be immediately responded to and the confirmed acknowledgment sent from the remote server's 534 cache to the trusted cache 918 of the STB 100, 114, 116 of the present invention. If the confirmed acknowledgement is not ready, it will simply ignore the request therefor, thereby forcing the STB 100, 114, 116 to repeat the request after a predetermined time until the confirmed acknowledgment is received. In the end, a confirmed acknowledgment is generated and provided to the user, the confirmed acknowledgment indicating either success of the transaction or failure thereof (due, for example, by the user's payment instrument being declined).

Transaction Session

Figure 17:
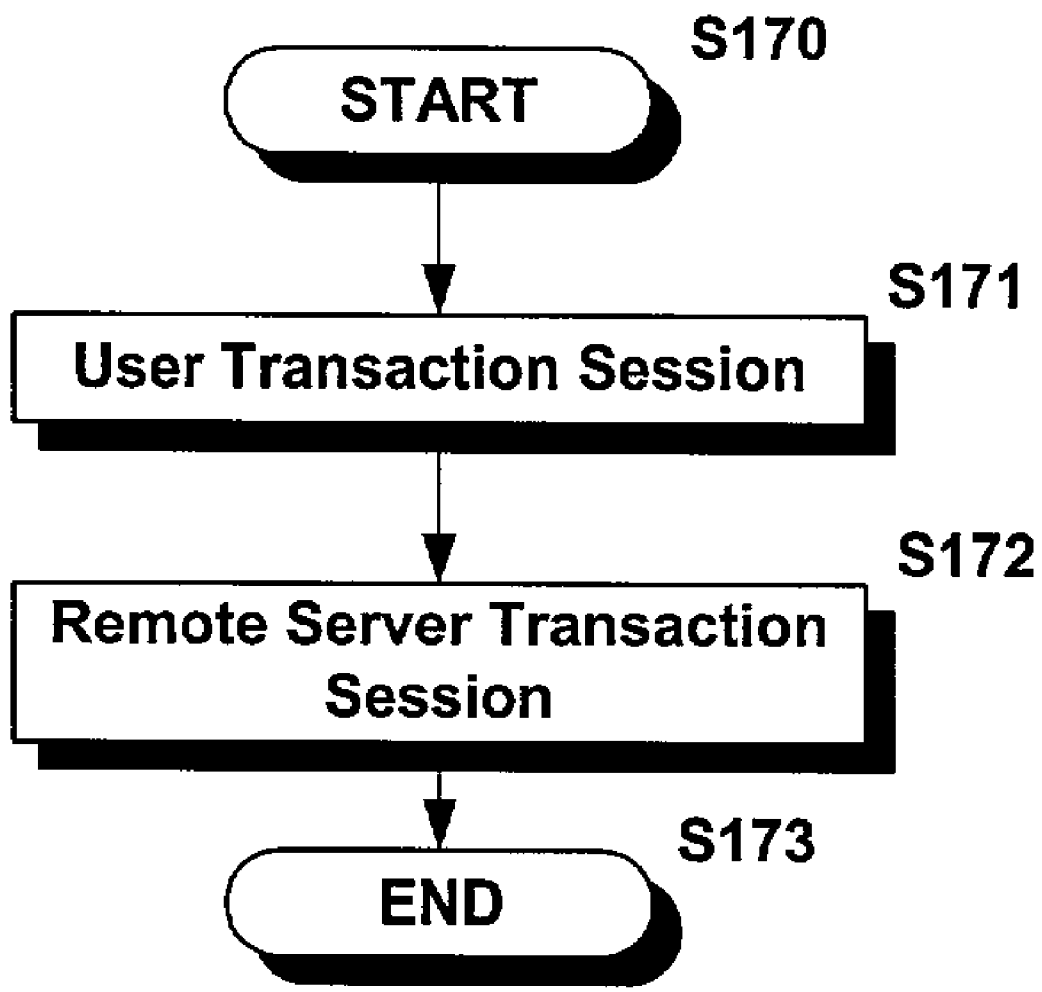
FIG. 17 is a flowchart of a transaction session, according to an embodiment of the present invention.

FIG. 17 is a flowchart of a transaction session, according to an embodiment of the present invention. The overall trusted transaction session called a "Transaction Session" that begins at S170 and ends at S173 that is executed by the control software of the STB 100, 114, 116 comprises two sessions; namely a user transaction session S171 followed by a remote server transaction Session 172, the details of which are discussed below.

User Session

Figure 18:
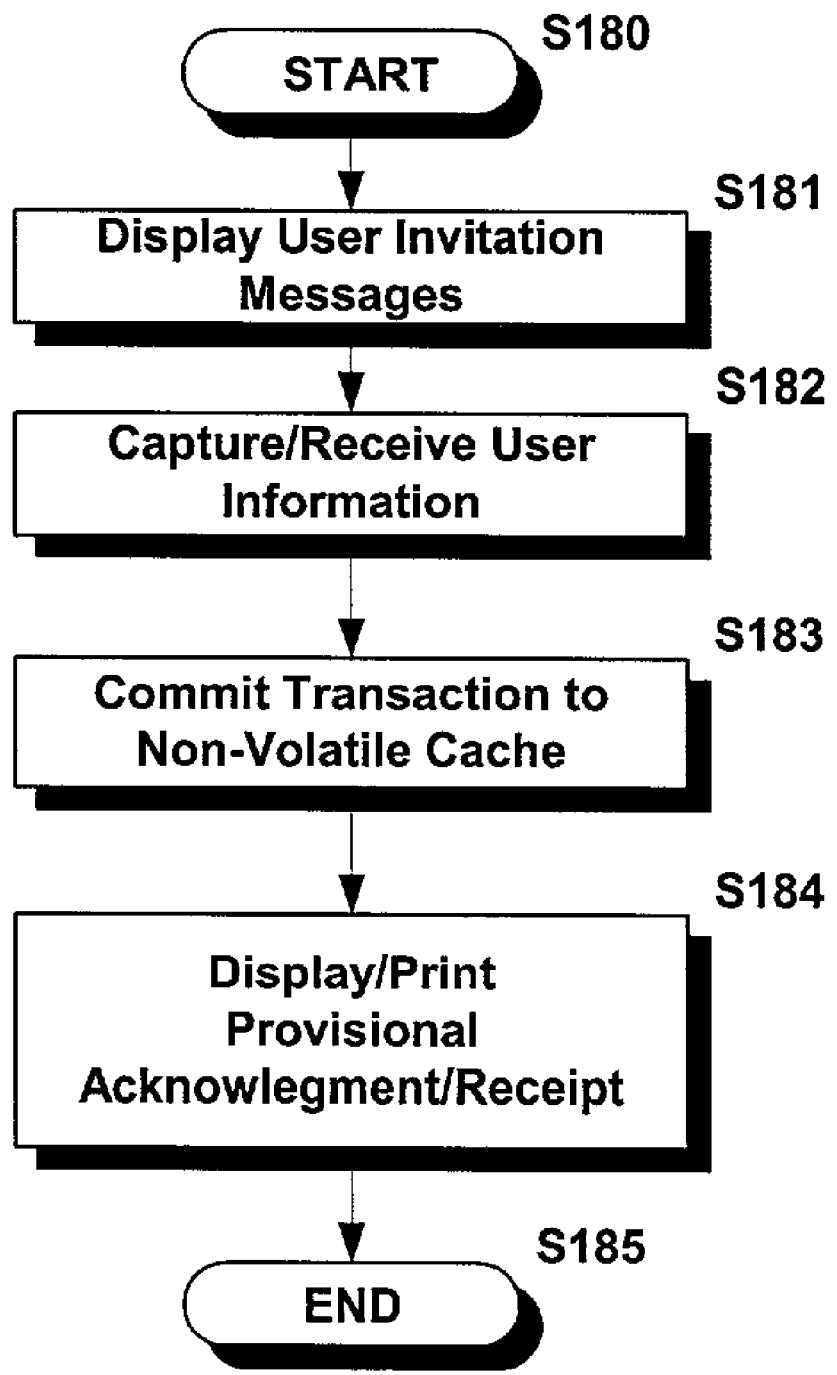
FIG. 18 is a flowchart of a user session, according to an embodiment of the present invention.

FIG. 18 is a flowchart of a user session, according to an embodiment of the present invention. The user session begins at S180 and ends at S185 and may include one or more of the following intervening steps. As shown at S181, a display (such as TV or HDTV 108, for example) may invite the user to initiate a purchase for a product and/or service. The user may then confirm his or her intention to initiate a purchase. The user's credentials; that is, his or her personal and/or financial information (identity, payment instrument details, etc.) may then be captured and/or inputted into the STB 100, 114, 116 according to the present invention, as shown at S182. The STB 100, 114, 116 thus captures the user's personal and/or payment credentials using some means of interaction, or alternatively from secured personal storage accessible to the STB control software. The STB control software may then commit the transaction to the non-volatile memory 924 of the trusted cache 918, as shown at S183, after which the STB 100, 114, 116 may provide, display or print a provisional acknowledgment for the user, as shown at S184. According to the present invention, the user need only be involved during the user session S180-S185, which may take only a few seconds or even less if bar-coded (or machine readable) items are scanned by the barcode (for example) reader 532.

Server Session

Figure 19:
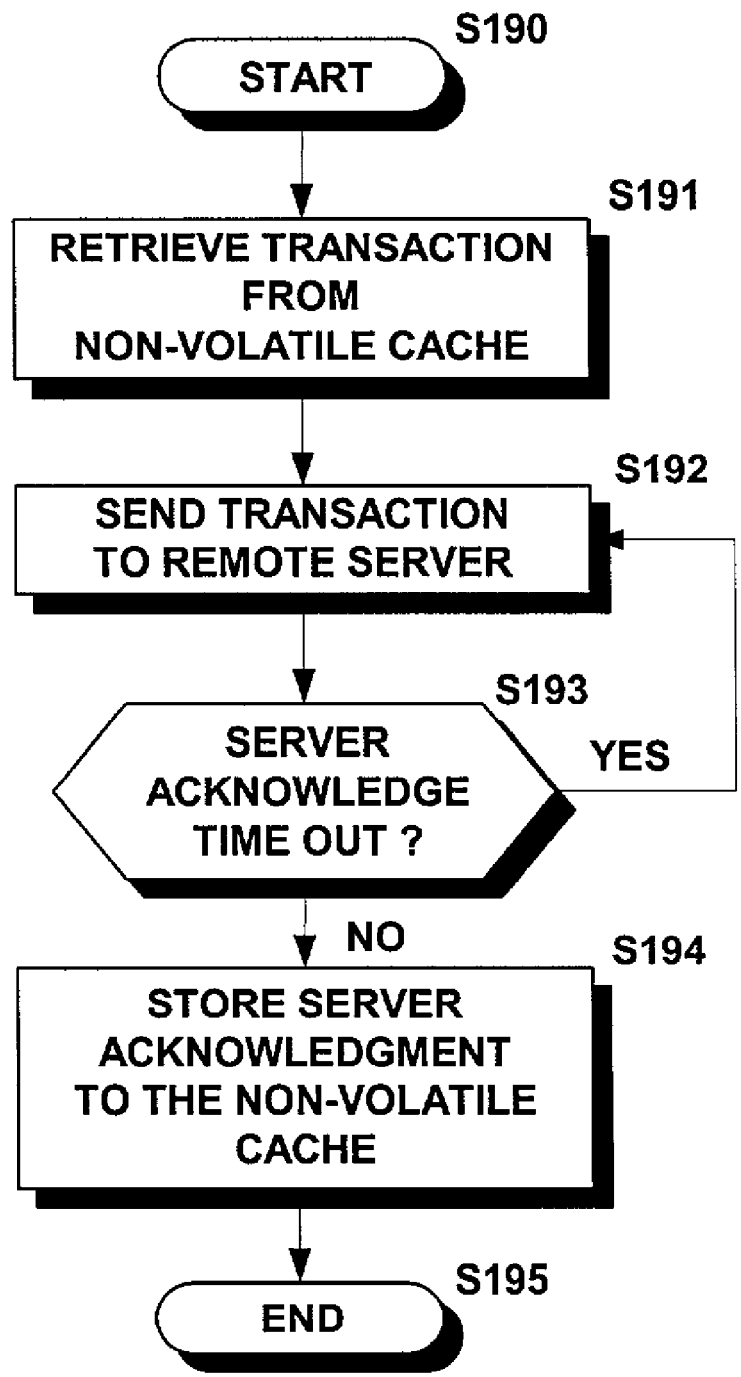
FIG. 19 is a flowchart of a server session, according to an embodiment of the present invention.

FIG. 19 is a flowchart of a server session from its initiation at S190 to the conclusion thereof, at S195, according to an embodiment of the present invention. According to the present invention, the server session may include one or more of the following steps. As shown at S191, the STB control software retrieves the transaction committed in the non-volatile trusted cache 918 during the user session. The STB 100, 114, 116 then sends the transaction to the remote server 534 over a computer network (such as the Internet 104, for example) or other communication channel, as shown at S192. If no acknowledgement is received from the remote server 534 by a predetermined and/or selectable timeout period, the STB 100, 114, 116 of the present invention may continually (or for a predetermined period of time or for a predetermined or selectable number of attempts) resend the transaction packet to the remote server 534, as indicated at S193. If the acknowledgment is indeed received by the STB 100, 114, 116 before the timeout period has elapsed, the received acknowledgment may be stored in the NVRAM 924 of the trusted cache 918. As is apparent from FIG. 19, the user of the STB 100, 114, 116 of the present invention (or the user of the device incorporating the present STB 100, 114, 116—for example, the STB 100, 114, 116 may be incorporated within the TV or HDTV 108) is not involved in the remote server 534 session. Optionally, the STB 100, 114, 116 control software may notify the user of the successful completion of the transaction by printing or otherwise providing the confirmed acknowledgment automatically, such as by sending an email to the user or by activating an alert message, to name a few possibilities.

In order for a transaction session to complete successfully without involving the user, it is necessary to examine all the failure situations that may interfere with the completion of the transaction. A formal methodology called Failure Modes, Effects and Criticality Analysis (FMECA) is useful in exhaustively identifying all possible failure possibilities, their impact and the effectiveness of the remedies.

The most common cause of transaction failure may be caused by the remote server 534 failing to timely respond with an acknowledgment of the transaction, for whatever reason (including, for example, a failure at some point along the communication path outside the STB 100, 114, 116). An effective remedy to such a failure is the transaction model described above, whereby the STB 100, 114, 116 is the transaction "master" that initiates and maintains control over the transaction with the remote server 534. Advantageously, the STB 100, 114, 116 according to the present invention may repeatedly send the transaction to the remote server 534 until a valid transaction acknowledgment is received from the remote server 534. The second common cause of transaction failure may be attributed to failure of the STB 100, 114, 116, due to mains power-failure, user power down, software crash and/or hardware latch-up, for example. An effective remedy to such failures is the use of NVRAM of the trusted cache 918 in which the critical states of the transaction are frequently saved. The control software of the STB 100, 114, 116 may then recover the context of the transaction from the critical state information stored in the trusted cache 918, and then resume its execution and control over transaction until completion thereof, as described hereunder.

Transaction Critical States

Figure 20:
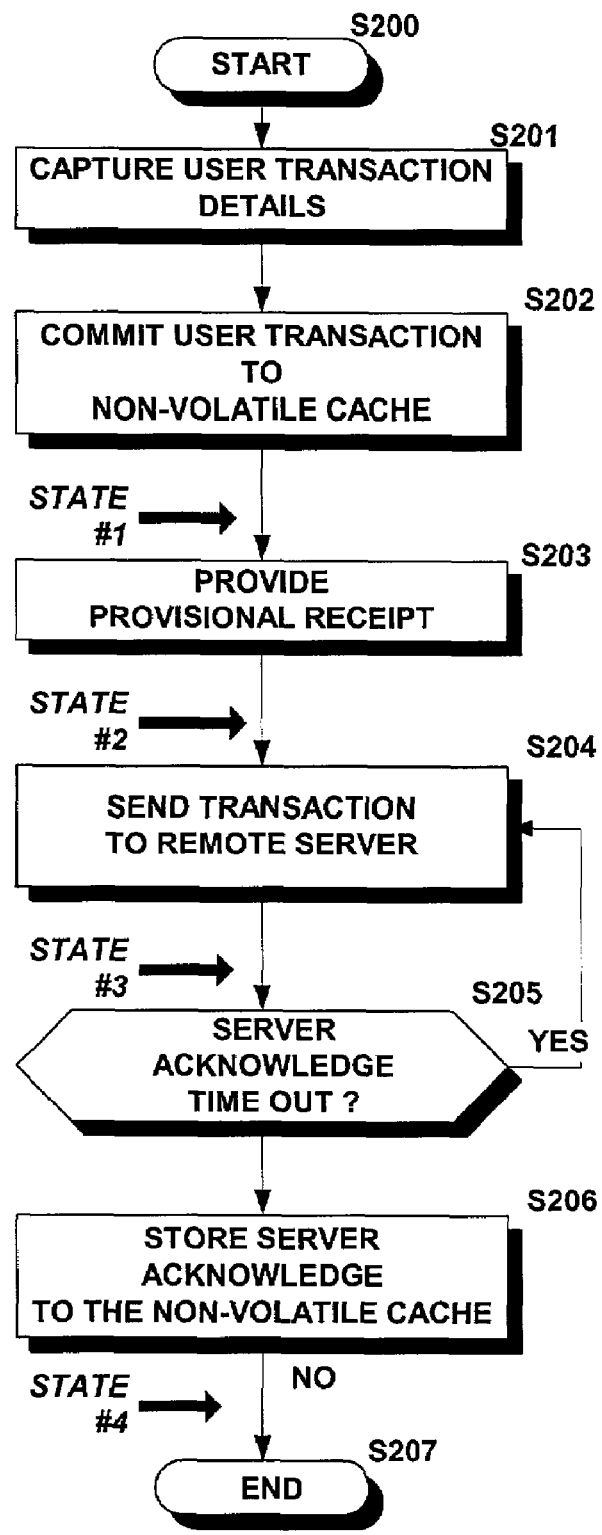
FIG. 20 is a flowchart showing the timing of the saving of the critical states or context of a trusted transaction, according to an embodiment of the present invention.

FIG. 20 is a flowchart showing the timing of the saving of the critical states of a trusted transaction, according to an embodiment of the present invention. The essential critical states are State#1, State#2, State#3, and State#4, as shown in the flowchart. The present invention provides for the saving in the trusted cache 918 of all the data necessary to describe the context of the transaction at that particular instant, including the state number itself. This saving of the critical states (context) may be carried out four times per transaction as shown in FIG. 20, or more or less often as necessary. Following a failure of the transaction, the STB 100, 114, 116 and/or the remote server 534 occurring between any of these critical states, the present STB 100, 114, 116 may retrieve the last saved state information from the trusted cache 918 and seamlessly resume and complete the execution from the saved state onward. As shown in FIG. 20, the method beings at S200, whereupon the present STB 100, 114, 116 captures (or retrieves) the user's personal and/or financial information. In step S202, after the user has selected products and/or services and committed to a transaction, the details of the user's transaction are committed to the NVRAM 924 of the trusted cache 918. The STB 100, 114, 116 of the present invention may then save all of the information necessary to reconstruct and continue the transaction to the NVRAM 924 of the trusted cache 918, as shown at State#1. At S203, the STB 100, 114, 116 may print, display or otherwise provide the user with a provisional acknowledgment or receipt. This state of the transaction (State#2) may then also be saved to the NVRAM 924 of the trusted cache 918. The user's transaction may then, as shown at S204, be sent to the remote transaction server 534, and the current state information may then again saved to the NVRAM 924 of the trusted cache 918, as shown at State#3. As indicated at S205, step S204 may be repeated (indefinitely if necessary) until a timely acknowledgment is received from the remote server 534. Alternatively, step S203 may be omitted between steps S202 and S204 and carried out only when the remote server 534 initially fails to send a timely acknowledgement back to the present STB 100, 114, 116. Upon receiving an acknowledgment from the remote server 534, the present STB 100, 114, 116 may store the received acknowledgement and all necessary contextual information to the NVRAM 924 of the trusted cache 918, as shown at State#4, whereupon the method ends at S207.

Recovery from Trusted Transaction Controller Temporary Failure

Figure 21:
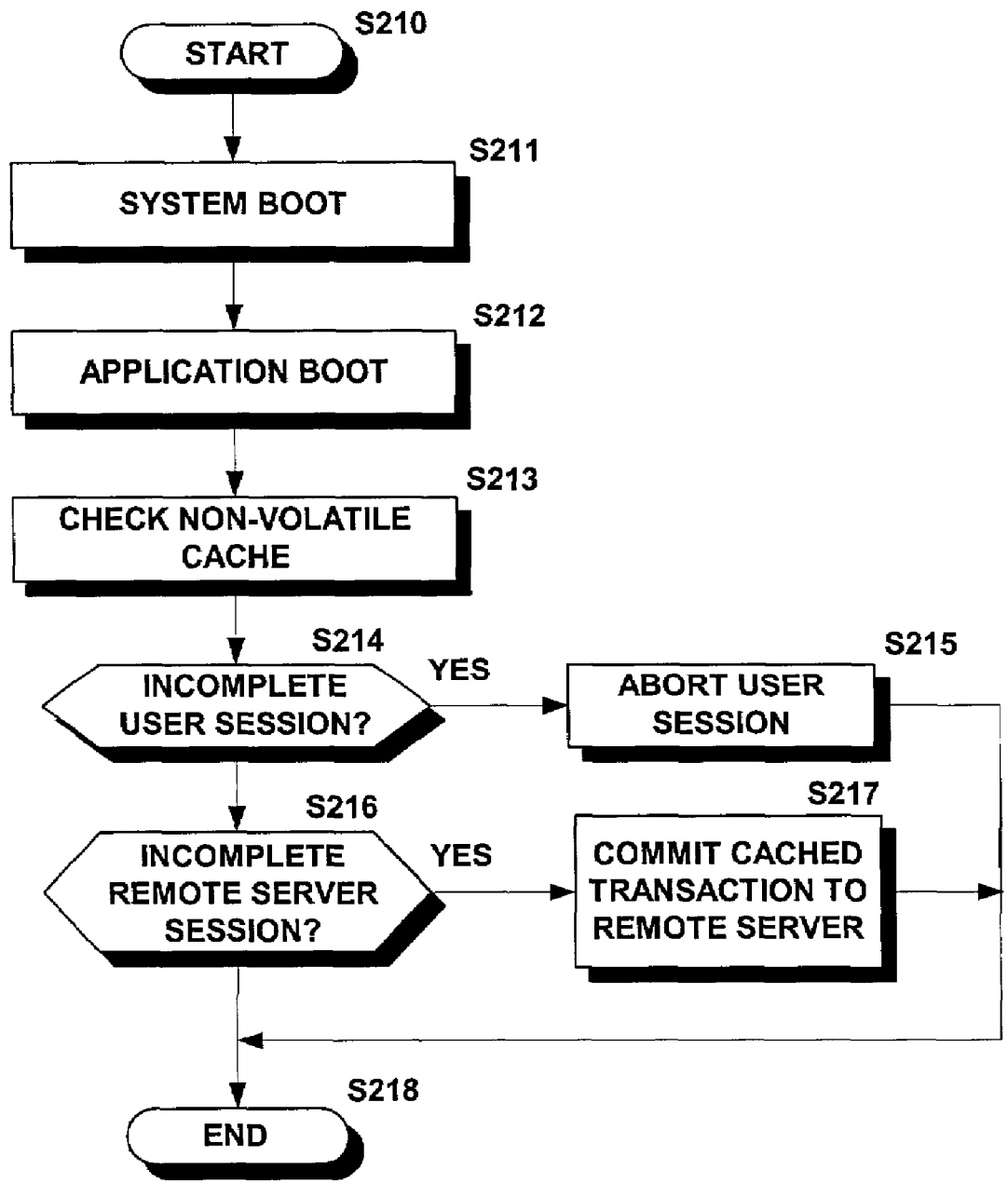
FIG. 21 is a flowchart illustrating the recovery from a temporary failure of a STB, according to an embodiment of the present invention.

FIG. 21 is a flowchart illustrating the recovery from a temporary failure of a STB 100, 114, 116, according to an embodiment of the present invention. Assuming a successful recovery cycle following a temporary failure whereby the STB 100, 114, 116 is successfully re-started, the STB 100, 114, 116 may execute the steps S210-S218 shown in the flowchart of FIG. 21. Namely, the operating system of the present STB 100, 114, 116 may reboot as shown at S211 and the application may start-up or boot as shown at S918. Thereafter, the CPU 902 (see FIG. 9) may examine the contents of the trusted cache 918, as shown at S213. If the last saved critical state (see FIG. 20) indicates that a user session is not completed at S214, the STB 100, 114, 116 may abort the user session, as shown at S215 and end the recovery, as shown at S218. If it is determined step in S216, however, that the last critical state saved shows that a remote server 534 session is incomplete, the saved state information may be retrieved from the trusted cache 918 and the transaction committed (sent) to the remote server 534, as shown at S217. The content of the trusted cache 918 may be encrypted or digitally signed, in order to prevent tampering during the transaction recovery process, by service people (for example) if the present STB 100, 114, 116 is sent for repair or service.

It is to be noted that the user may choose not to receive a provisional acknowledgment (ticket). In that case, only the confirmed acknowledgment will be printed or otherwise provided whenever the acknowledgement is received from the remote server 534. In either case, the user need not wait in front of the display screen for the overall transaction to complete, and would therefore be afforded additional time to fully enjoy the shopping and/or entertainment experience provided by the present STB 100, 114,116.

As noted above, the present STB 100, 114, 116 (and not the remote server 534) is the transaction "master". Therefore, user personal and payment instrument information and the like are supplied to the remote server 534 under the full control of the STB 100, 114, 116, including recovery from failure. Consequently, users will very quickly come to trust such a system, especially when many small merchants are involved in such e-microcommerce transactions that depend upon frequent micro-payments.

It is not recommended, within the context of the present invention, to encapsulate the transaction model described within XML, because of the large overhead created by XML. Instead, the transaction model proposed herein may advantageously be used as a means to efficiently and securely process the transaction "payload" while the associated rich and "free" content may be handled according to traditional protocols, such as HTML, Java, XML, for example. It should be apparent that the transactional model and set top box 100 proposed herein may be initiated by a user from the STB 100, 114, 116, from any client PC 112, 118, 120 or client STB 116 connected to a home network 106.

Unlike other models that require an account with an online provider to have previously been set up, the present invention does not require that the user be previously known to the provider in order to complete a transaction. Indeed, as the present STB 100, 114, 116 is equipped with devices to access personal information stored securely (on a personal Smart Card in the smart card reader, or on the Personal Remote Control 502), the information related to the item chosen together with the user credentials (including the user's personal and/or payment instrument information, for example) and the delivery address are preferably sent to the remote server 534 in the same single data packet. The sensitive information may be encrypted using for example the provider's public key that is automatically made available together with the rich content describing the product or service, thus avoiding the unnecessary overhead of establishing a full SSL (Secure Socket Layer) or TLS (Transport Layer Security) session.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A set top box comprising:
   a processor for controlling the set top box;
   a video decoder coupled to the processor, the video decoder providing a decoded video signal;
   a graphics interface coupled to the video decoder to output the decoded video signal to at least one display;
   a network interface to access a computer network;
   a user interface enabling user interaction with the processor, initiating a transaction and committing the transaction to a remote server coupled to the computer network, and
   a non-volatile cache memory coupled to the processor, the non-volatile cache memory including:
   a Non-Volatile Random Access Memory (NVRAM);
   a context data save engine configured to store a context of the committed transaction to the NVRAM after the committed transaction is sent to the remote server but before an acknowledgement of the committed transaction is received from the remote server;
   a printer coupled to the processor, the processor controlling the printer to print a confirmed acknowledgment ticket when a confirmation of the committed transaction is received from the remote server within a predetermined period of time, the processor controlling the printer to print a provisional acknowledgment ticket when the confirmation of the committed transaction is not received from the remote server within the predetermined period of time, at least the provisional acknowledgment ticket including machine readable information that uniquely identifies the committed transaction, and
   a reader configured to read at least the machine readable information printed on the provisional acknowledgment ticket, the processor being further configured to control the printer to print the confirmed acknowledgment ticket corresponding to the uniquely identified committed transaction if the acknowledgment was received from the remote server since the provisional acknowledgment ticket was printed.

2. The set top box of claim 1, wherein the context data save engine is further configured to store the context of the transaction at least one of:
   before sending the transaction to the remote server, and
   after having received a confirmed acknowledgment of the transaction from the remote server.

3. The set top box of claim 1, wherein the machine-readable information includes a barcode and wherein the reader includes a barcode reader.

4. The set top box of claim 2, wherein the processor is configured to execute the transaction in a first user session that concludes after the context data save engine has saved the context of the transaction to the NVRAM and the provisional acknowledgment ticket is printed and to execute a second remote server session that concludes after the acknowledgement is received from the remote server and the confirmed acknowledgment ticket is printed.

5. The set top box of claim 1, further comprising a hardware random number generator, the hardware random number generator being configured to provide the processor with encryption keys to encrypt the user initiated transaction.

6. The set top box of claim 1, wherein the at least one display includes at least one of a television set, a High Definition Television (HDTV) and a computer monitor, the graphics interface being configured to selectively output the decoded video signal to the at least one display in full screen mode, picture-in-picture mode, mosaic mode or multi-window mode.

7. The set top box of claim 1, further comprising at least one of a magnetic and a smart card reader.

8. A method of carrying out an online transaction between a set top box and a remote server, each of the set top box and the remote server being coupled to a network, the method comprising the steps of:
   initiating a transaction at the set top box;
   storing a copy of the transaction in a non-volatile memory within the set top box;
   sending the transaction to the remote server under a control of the set top box;
   printing a confirmed acknowledgment ticket of the transaction when a confirmed acknowledgment of the transaction is received from the remote server within a predetermined period of time;
   printing a provisional acknowledgment ticket that includes machine readable information that uniquely identifies the transaction from the copy of the transaction stored in the non-volatile memory when the confirmed acknowledgment is not received within the predetermined period of time;
   reading the printed machine-readable information upon presentation of the provisional acknowledgment ticket to the set top box, and
   printing the confirmed acknowledgment ticket corresponding to the uniquely identified transaction if the confirmed acknowledgment was received from the remote server since the provisional acknowledgment ticket was printed.

9. The method of claim 8, further comprising the step of:
   receiving the confirmed acknowledgment from the remote server after the predetermined period of time and storing the received confirmed acknowledgment in the non-volatile memory.

10. The method of claim 9, further including a step of providing the stored confirmed acknowledgment upon request.

11. The method of claim 8, further comprising the step of re-sending the copy of the user transaction stored in the non-volatile memory to the remote server upon failure to receive the confirmed acknowledgment from the remote server.

12. The method of claim 11, wherein the re-sending step is carried out until a confirmed acknowledgment of the transaction is received from the remote server.

13. The method of claim 11, wherein the re-sending step is carried out a predetermined number of times.

14. The method of claim 8, wherein the set top box includes a user interface that enables user interaction with the set top box and wherein the initiating step includes a step of providing user credentials and selecting goods and/or services for purchase via the user interface.

15. The method of claim 14, wherein the user credentials include at least one of identification and payment instrument information and wherein the user credentials are supplied to the set top box via a remote control device.

16. The method of claim 8, wherein the initiating step includes a step of encapsulating all information required for the remote server to process the transaction into a single data packet and wherein the storing and sending steps store and send the single data packet in the non-volatile memory and to the remote server, respectively.

17. The method of claim 16, wherein the information required for the remote server to process the transaction includes at least one of:
   user credentials including at least one of an identity of the user;
   payment instrument information;
   delivery information, and
   information identifying the subject matter of the transaction.

18. The method of claim 16, further including a step of encrypting the single data packet prior to the sending step.

* * * * *